United States Patent
Strong et al.

(10) Patent No.: US 7,306,057 B2
(45) Date of Patent: Dec. 11, 2007

(54) THERMAL DRILL CUTTINGS TREATMENT WITH WEIR SYSTEM

(75) Inventors: Gary S Strong, Huntsville, TX (US); Dale A. Pierce, The Woodlands, TX (US); Lyndon Stone, Humble, TX (US); Cliff Gaddis, Pasadena, TX (US); Bradford R Wood, Houston, TX (US); Kenneth W. Seyffert, Houston, TX (US); Cecil Lee, Hixson, TN (US)

(73) Assignee: Varco I/P, Inc., Houston, TX (US)

( * ) Notice: Subject to any disclaimer, the term of this patent is extended or adjusted under 35 U.S.C. 154(b) by 500 days.

(21) Appl. No.: 10/945,270

(22) Filed: Sep. 20, 2004

(65) Prior Publication Data

US 2005/0279715 A1 Dec. 22, 2005

Related U.S. Application Data

(63) Continuation-in-part of application No. 10/051,314, filed on Jan. 18, 2002, now abandoned.

(51) Int. Cl.
    *E21B 21/06* (2006.01)
(52) U.S. Cl. .................. 175/66; 175/206; 134/25.1; 210/770; 210/774; 210/781; 588/228
(58) Field of Classification Search ................ None
    See application file for complete search history.

(56) References Cited

U.S. PATENT DOCUMENTS 2,276,075 A  3/1942  Wuensch .............. 175/66
2,576,283 A  11/1951 Chaney
3,221,825 A  12/1965 Henderson (Continued)

FOREIGN PATENT DOCUMENTS

GB    2 089 403 A    6/1982

(Continued)

OTHER PUBLICATIONS

Int'l Search Report Form PCT/ISA210 May 19, 2003 4 pages.

(Continued)

*Primary Examiner*—Robert James Popovics
(74) *Attorney, Agent, or Firm*—Guy McClung

(57) ABSTRACT

A method for treating material, the material contaminated with contaminants, the method including: introducing material with contaminants to a system for remediation including a thermal treatment system, a quench system, a weir tank system and a condensing system; feeding a slurry of the material to the thermal treatment system and heating the material therein producing heated discharge solids and a discharge stream with liquid and solids therein; optionally, discharging the heated discharge solids and feeding them to a mill system; feeding the discharge stream to a quench system producing a cooled discharge stream which is fed to the weir tank system; the weir tank system having a clean side and a dirty side; the cooled discharge stream fed to the dirty side of the weir tank system, and from the weir tank system producing at least one stream of cleaned liquid and a stream with contaminants therein; and, in one particular aspect, remediating drilled cuttings material using such a method.

20 Claims, 19 Drawing Sheets

U.S. PATENT DOCUMENTS

| | | | |
|---|---|---|---|
| 3,556,413 A | 1/1971 | Lindgren | 239/658 |
| 3,637,031 A | 1/1972 | Hull et al. | 175/66 |
| 3,777,405 A | 12/1973 | Crawford | 34/57 R |
| 3,860,019 A * | 1/1975 | Teague | 134/109 |
| 3,923,097 A | 12/1975 | Hovad | 165/92 |
| 4,052,151 A | 10/1977 | Reichrt et al. | 432/115 |
| 4,140,478 A | 2/1979 | Kawakami et al. | 432/13 |
| 4,181,494 A | 1/1980 | Kimberley | 432/2 |
| 4,222,988 A | 9/1980 | Barthel | 422/309 |
| 4,257,168 A | 3/1981 | Carroll et al. | 34/17 |
| 4,304,609 A | 12/1981 | Morris | 134/19 |
| 4,337,583 A | 7/1982 | Harris | 34/33 |
| 4,338,080 A | 7/1982 | Grandcolas et al. | 432/115 |
| 4,411,074 A | 10/1983 | Daly | 34/32 |
| 4,457,520 A | 7/1984 | Grachtrup | 277/85 |
| 4,507,208 A | 3/1985 | Simon et al. | 210/721 |
| 4,535,550 A | 8/1985 | Walter | 34/33 |
| 4,576,572 A | 3/1986 | Mueller et al. | 432/13 |
| 4,725,362 A | 2/1988 | Dugat | 210/710 |
| 4,730,564 A | 3/1988 | Abboud | 110/246 |
| 4,913,245 A | 4/1990 | Skinner | 175/66 |
| 4,990,237 A | 2/1991 | Hever et al. | 208/13 |
| 5,088,856 A | 2/1992 | Yocum | 405/128 |
| 5,090,498 A | 2/1992 | Hamill | 175/206 |
| 5,129,468 A | 7/1992 | Parmenter | 175/66 |
| 5,152,233 A | 10/1992 | Spisak | 110/240 |
| 5,172,709 A | 12/1992 | Eckhardt et al. | 134/95.1 |
| 5,199,354 A | 4/1993 | Wood | 110/241 |
| 5,273,629 A | 12/1993 | Meenan et al. | 204/131 |
| 5,302,118 A | 4/1994 | Renegar et al. | 432/14 |
| 5,361,514 A | 11/1994 | Lahoda et al. | 34/391 |
| 5,378,059 A | 1/1995 | Brock | 366/7 |
| 5,383,672 A | 1/1995 | Cornelius | 277/152 |
| 5,388,985 A | 2/1995 | Musil et al. | 431/116 |
| 5,403,085 A | 4/1995 | Banks | 366/23 |
| 5,413,129 A | 5/1995 | Shenoi | 134/65 |
| 5,439,489 A | 8/1995 | Scalliet et al. | 44/281 |
| 5,443,717 A | 8/1995 | Scalliet et al. | 208/131 |
| 5,454,957 A | 10/1995 | Roff | 210/768 |
| 5,480,226 A | 1/1996 | Milstead | 366/7 |
| 5,499,586 A | 3/1996 | Davis | 110/246 |
| 5,523,060 A | 6/1996 | Hogan | 422/184.1 |
| 5,551,870 A | 9/1996 | Gale | 543/115 |
| 5,570,749 A | 11/1996 | Reed | 175/66 |
| 5,736,031 A | 4/1998 | Nye et al. | 208/340 |
| 5,814,230 A | 9/1998 | Willis et al. | 210/710 |
| 5,853,583 A | 12/1998 | Shah | 210/340 |
| 5,927,970 A | 7/1999 | Pate et al. | 432/115 |
| 5,964,304 A | 10/1999 | Morrison, Jr. et al. | 175/38 |
| 5,996,690 A | 12/1999 | Shaw et al. | 166/250.01 |
| 6,106,733 A | 8/2000 | Wood | 210/774 |
| 6,120,650 A | 9/2000 | Nye et al. | 196/116 |
| 6,162,284 A | 12/2000 | Mitchell et al. | 95/261 |
| 6,179,071 B1 | 1/2001 | Dietzen | 175/66 |
| 6,186,337 B1 * | 2/2001 | Adams et al. | 209/401 |
| 6,345,672 B1 | 2/2002 | Dietzen | 175/66 |
| 6,346,197 B1 | 2/2002 | Stephenson et al. | 210/704 |
| 6,530,438 B1 * | 3/2003 | McIntyre | 175/66 |
| 6,533,946 B2 * | 3/2003 | Pullman | 210/787 |
| 6,550,552 B1 * | 4/2003 | Pappa et al. | 175/66 |
| 6,602,181 B2 * | 8/2003 | Quintero et al. | 588/250 |
| 6,695,077 B2 | 2/2004 | Szymocha et al. | 175/66 |
| 6,745,856 B2 | 6/2004 | Simpson et al. | 175/66 |
| 6,953,097 B2 * | 10/2005 | Seyffert | 175/66 |
| 6,978,851 B2 * | 12/2005 | Perez-Cordova | 175/206 |
| 2002/0033278 A1 | 3/2002 | Reddoch | |
| 2002/0074269 A1 | 6/2002 | Hensley et al. | |
| 2003/0136747 A1 * | 7/2003 | Wood et al. | 210/774 |
| 2005/0153844 A1 * | 7/2005 | McIntyre | 507/100 |
| 2005/0279715 A1 * | 12/2005 | Strong et al. | 210/774 |

FOREIGN PATENT DOCUMENTS

| | | |
|---|---|---|
| WO | WO 02/070151 A1 | 9/2002 |

OTHER PUBLICATIONS

Elements of Thermally Treating Oil Base Mud Cuttings, Young et al, SPE/1ADC 21939, 1991.

Indirect Thermal Desorpation, Wood et al, 2000.

THOR (TM) Thermal Oil Recovery System, Brandt A Tuboscope Co., 2000.A revolutionary, cost-effective, on-location solution to soil remediation, Onsite Technology LLC, 2000.

Test Results For Petroleum Based Hydrocarbons, Nat'l Fuel & Energy, Inc., 1995.

Quote D359, Tarmac Environmental Co. Inc., Mar. 12, 1998.

System Core Separator, LSR Technologies, Inc., 1996.

New Particulate Control Technology for Energy Production Systems, Wysk et al, Air & Waste Management Assoc., 1996.

Environmentally Sound, Cost-Effective Oilfield Waste Disposal, Sweco Oilfield Services, 1999.

* cited by examiner

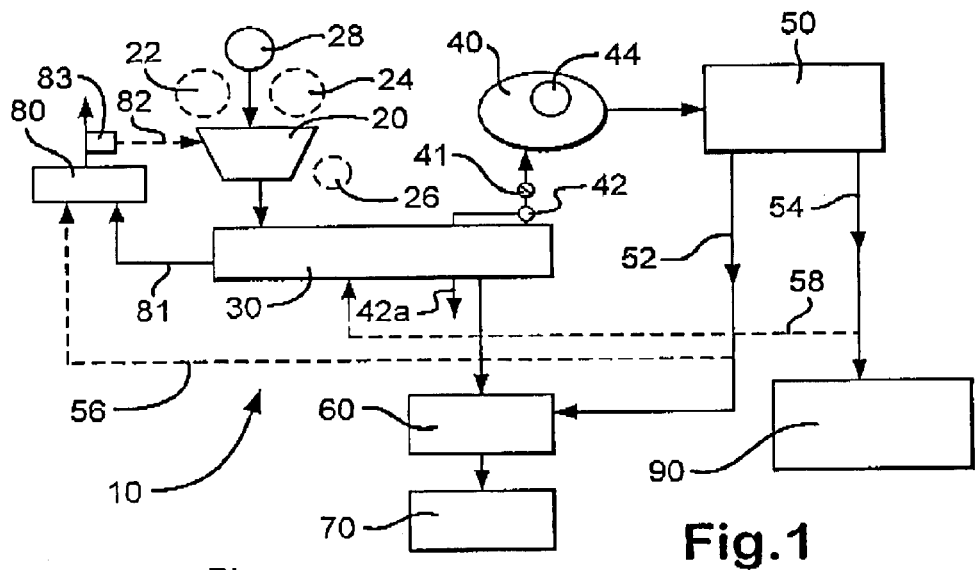
Fig.1
*Prior Art*
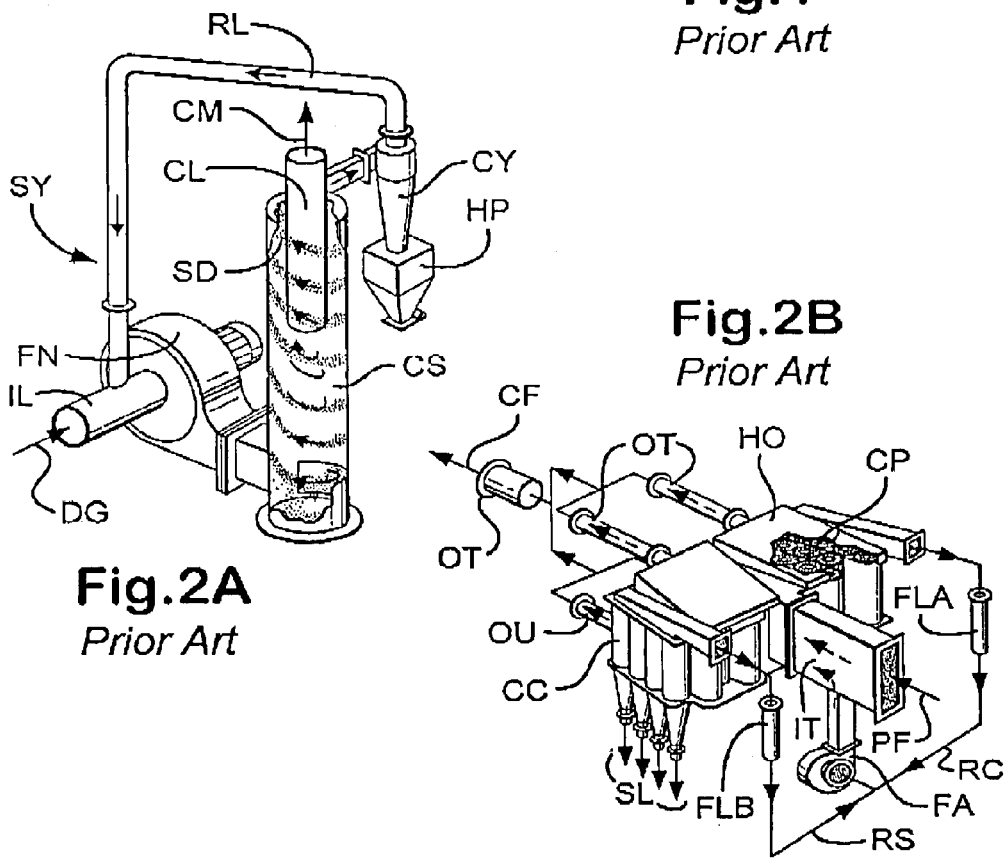
Fig.2A
*Prior Art*
Fig.2B
*Prior Art*

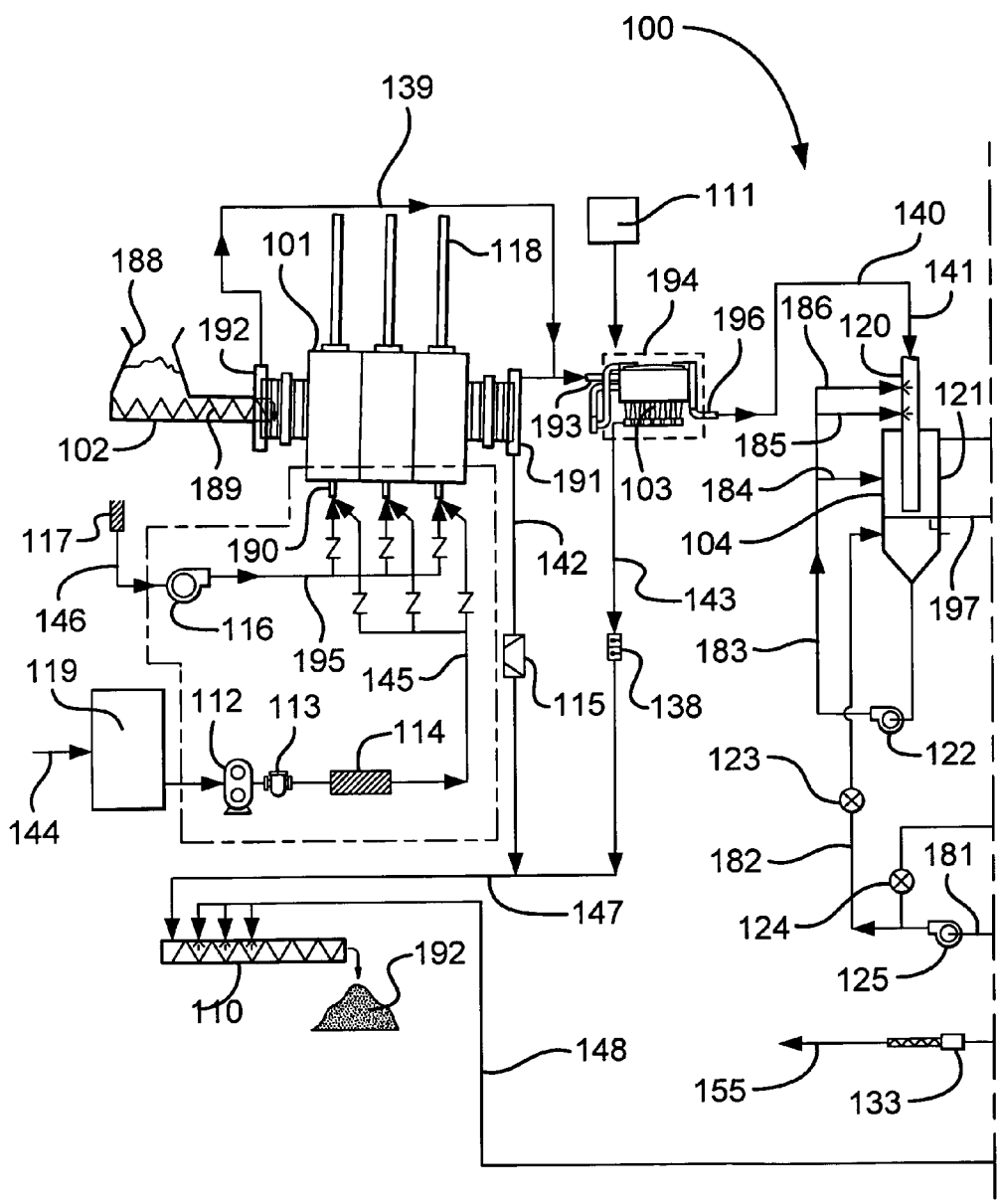
Fig.7¹

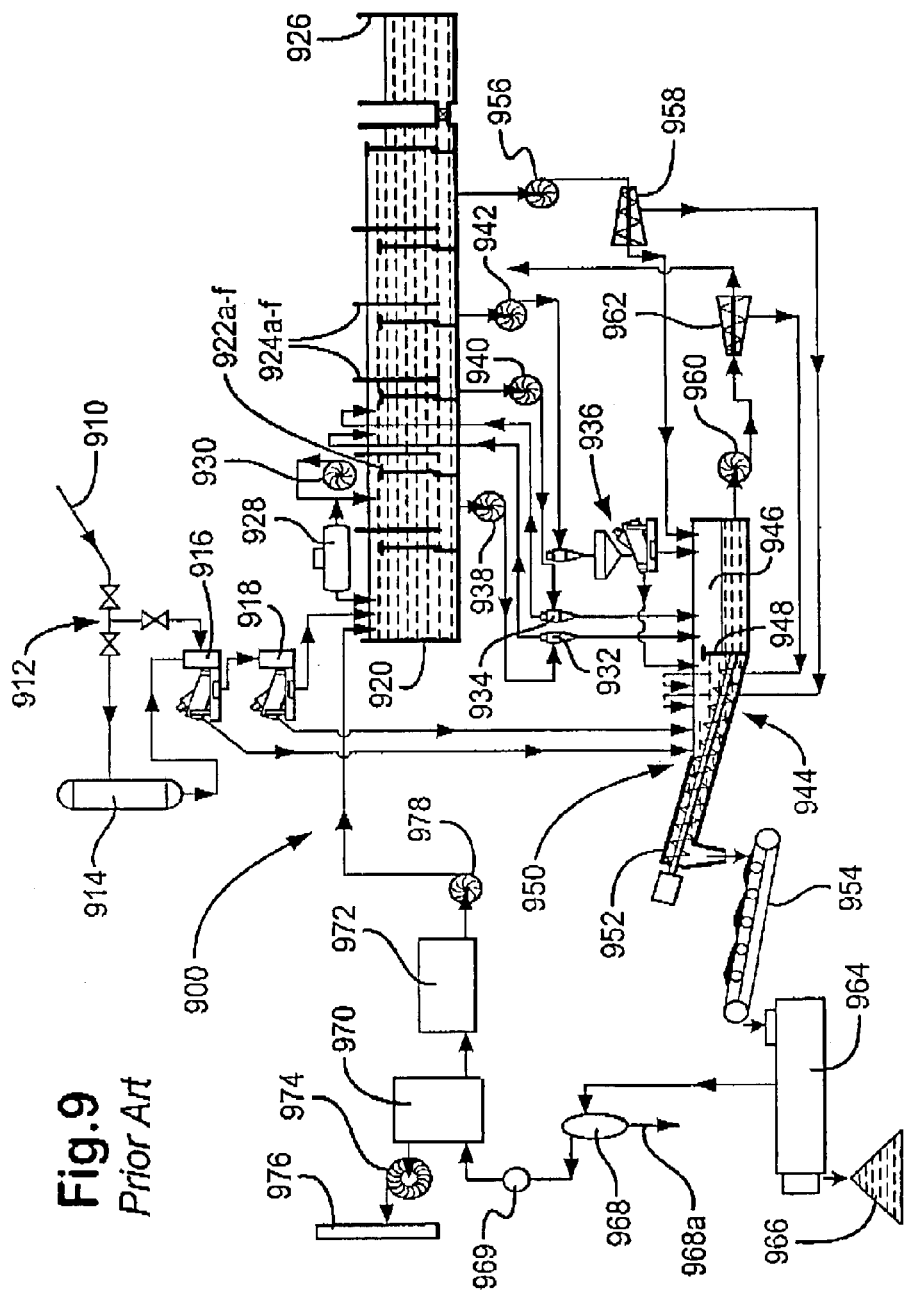
Fig.9 *Prior Art*

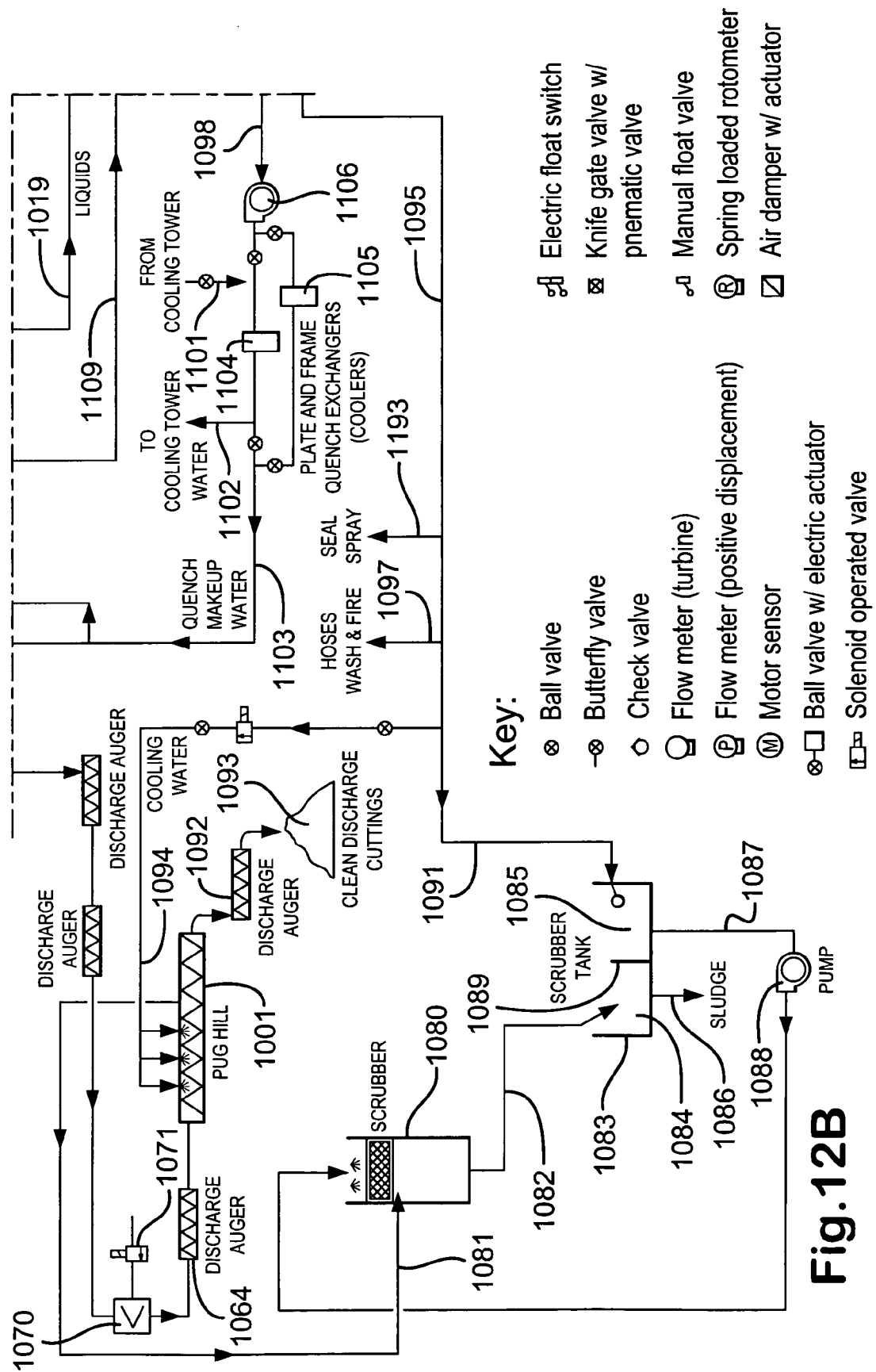

THERMAL DRILL CUTTINGS TREATMENT WITH WEIR SYSTEM

RELATED APPLICATION

This is a continuation-in-part of U.S. application Ser. No. 10/051,314 filed Jan. 18, 2002 now abandoned.

BACKGROUND OF THE INVENTION

1. Field of the Invention

The present invention is directed to systems and methods for cleaning contaminated soil and, in one particular aspect, to cleaning wellbore drilling cuttings, either on-shore or offshore.

2. Description of Related Art

In a variety of industrial methods, operations, and processes soil becomes contaminated with contaminants such as hydrocarbons and other volatile organic materials and substances. The prior art discloses a wide range of systems and methods for cleaning such soil and for disposal of such contaminants.

Drilling fluids used in hydrocarbon well drilling, as well known in the prior art, pick up solid cuttings and debris which must be removed if the fluid is to be re-used. Drilling fluid, called "mud," is typically either water based or oil-based. "Oil" includes, but is not limited to, diesel, crude oil, mineral oil and synthetic oil. Typically a mud with various additives is pumped down through a hollow drill string (pipe, drill collar, bit, etc.) into a well being drilled and exits through holes in a drillbit. The mud picks up cuttings (rock), other solids, and various contaminants, such as, but not limited to, crude oil, water influx, and salt from the well and carries them upwardly away from the bit and out of the well in a space between the well walls and the drill string. At the top of the well, the contaminated solids-laden mud is discharged over a shale shaker which has a series of screens that catch and remove solids from the mud as the mud passes through them. If drilled solids are not removed from the mud used during the drilling operation, recirculation of the drilled solids can create weight, viscosity, and gel problems in the mud, as well as increasing wear on mud pumps and other mechanical equipment used for drilling.

In one typical prior art system, land-based or offshore, (e.g. as shown in U.S. Pat. No. 5,190,645), a well is drilled by a bit carried on a string of drill pipe as drilling mud is pumped by a pump into the drill pipe and out through nozzles in the bit. The mud cools and cleans the cutters of the bit and then passes up through the well annulus flushing cuttings out with it. After the mud is removed from the well annulus, it is treated before being pumped back into the pipe. The mud enters a shale shaker where the relatively large cuttings are removed. The mud then enters a degasser where gas can be removed if necessary. The degasser may be automatically turned on and off, as needed, in response to an electric or other suitable signal produced by a computer and communicated to degasser. The computer produces the signal as a function of data from a sensor assembly associated with shale shaker. The mud then passes to a desander and (or a desilter, optionally mounted over a shale shaker to reduce liquid losses), for removal of smaller solids picked up in the well. In one aspect, the mud next passes to a treating station where, if necessary conditioning media, such as barite, may be added. Suitable flow controls e.g. a valve, control the flow of media. The valve may be automatically operated by an electric or other suitable signal produced by the computer as a function of the data from sensor assembly. From the treatment station, the mud is directed to a tank from which a pump takes suction, to be re-cycled through the well. Remediation of cuttings on-site at an offshore rig is a difficult and expensive operation. It is known to remove cuttings from a rig in a barge to a land-based facility.

Thermal desorption processes are well known for remediating contaminated soil, both indirect processes in which material is isolated from flame and heat is applied above the vaporization temperature of a contaminant and direct processes in which material is directly heated with a flame. Often in direct processes, volatile contaminants are destroyed by direct flame contact and a portion of them may be thermally destroyed in a downstream oxidizer.

There has long been a need for an effective and efficient system for treating contaminated soil and drilling cuttings.

SUMMARY OF THE PRESENT INVENTION

The present invention discloses, in certain embodiments, a wellbore cuttings remediation system that separates cuttings from a wellbore drilling mixture and then treats the cuttings to produce acceptably disposable material and re-cyclable fluid. Such systems may be land-based or configured for offshore use. A wellbore drilling mixture may contain cuttings, oil, water, diesel, debris and/or other contaminants. Typically drilled cuttings contain about 15% to about 30% contaminants (e.g. hydrocarbons) by volume, or higher. In one aspect the present invention discloses systems and methods for remediating drilled cuttings material that use a weir tank and includes drilled cuttings, contaminants, solids, oil, and water from a wellbore, the methods including introducing the drilled cuttings material to a system for remediation, the system including a thermal treatment system, a quench system, and a weir tank system, feeding a slurry of the drilled cuttings material to the thermal treatment system and heating the slurry therein producing heated cuttings and a produced stream with oil, water and solids therein, discharging the heated cuttings from the thermal treatment system, feeding the produced stream to a quench system to cool said stream producing a cooled stream, feeding the cooled stream to a weir tank system and producing with the weir tank system a first cleaned stream with oil therein and a dirty stream with liquid and solids therein.

In one embodiment a system according to the present invention has a dryer subsystem and a condenser subsystem. The dryer subsystem, in one aspect, has a feed system, an optional classification system, and a heater dryer. Input cuttings are fed to a hopper and/or shredder. Pieces of acceptable size are then fed to the heater dryer (wherein certain contaminants, including but not limited to hydrocarbon contaminants), are vaporized and/or volatilized in an environmentally acceptable manner. In one aspect, a resulting gas/vapor stream with some solids therein is fed to a dual component mechanical separator which has one or more centrifugal separators whose output is fed to one or more cyclonic apparatuses and, optionally, the output of the cyclonic apparatuses is recirculated to the centrifugal separator(s). Solids separation and solids collection are thus accomplished separately and in different system components. Such a mechanical separation system includes, but is not limited to, a dual component separator according to the present invention and the prior art Core Separator of LSR Technologies, Inc. of Acton, Mass. Solids separated by the dual component separator are discharged for further treatment and/or collection and disposal and a resulting vapor stream is, optionally, quenched and/or condensed. In one embodiment, a liquid output of the dual component separator, following quenching, is fed to a liquid/solid separator (optionally with a water input )from which separated oil flows to an oil collection tank and separated sludge (e.g. fine solids and oil) flows to a collection tank or pit. Vapor from the quench step is, optionally, condensed (e.g., but not limited to, using a shell-and-tube condenser) from which condensed liquids flow to the liquid/solid separator and vapor flows to a cooling apparatus, e.g., but not limited to, a fin-fan cooler or a cooling heat exchanger. If the cooling apparatus produces any noncondensables (e.g. light hydrocarbons, oil and/or water), they may, optionally, be oxidized, e.g., by heating with one or more burners, directly or indirectly, or in a thermal oxidizer. Optionally oil from the liquid/solid separator may be further treated in another liquid/solid separation apparatus, including, but not limited to, a slant bed coalescing liquid separator that produces oil, water and sludge outputs. In other embodiments, any condensed stream is stored and/or recycled within the system or is disposed of. Sterile material from the dryer may, if desired, be re-hydrated and/or discharged overboard from an offshore rig. Alternatively, the sterile material may be shipped from a rig.

The condenser subsystem processes the exhaust gas stream produced by heating and volatilizing of the material in the heater dryer and by separation by the dual component separator. The dual component separator removes fines such as dust and other fine particulates from a stream flowing from the thermal treatment system to the oil/water separator to prevent such particulates from remaining in an oil stream produced by the oil/water separator and/or from an exhaust stream, producing a clean discharge. A suitable typical blower or air mover may be used to pull the stream from the heater dryer to the dual component separator, and/or to the other component(s) and separator(s). Recovered water may, according to the present invention, be used, e.g., for re-hydration of cuttings or added to the drilling fluid. Recovered oil may be used to fire burners, or as a mud additive. Recovered diesel may be used to fire the heater dryer. Any oil separator may have an exhaust that is fed to a burner and/or to an exhaust stack.

In one embodiment, a cuttings treatment system according to the present invention removes hydrocarbon contaminates ranging from fuel oils/short chain hydrocarbons to heavy oils/long chain hydrocarbons. The system, in one aspect, uses a stainless steel heater dryer shell (or drum) with higher material discharge temperatures. The equipment can process a wide range of material sizes from clay to 3" rock. The throughput capacity range of one embodiment is from 13 tons per hour (TPH) to 15 TPH depending on drum size. In certain aspects drum size ranges between four and nine feet in diameter.

Contaminated materials including cuttings and soil are, in at least certain aspects, weighed, and placed into a holding hopper equipped with a variable speed feeder which meters the material into an auger which transports the material to a rotary dryer. The dryer unit, in one aspect, dries and heats the contaminated material indirectly so that hot gases and/or flames do not come in contact with it or with the hydrocarbon/water gas stream. Optionally any oil or diesel is filtered before it is burned. Temperature is increased to vaporize the water and hydrocarbons in the material; also a relatively small portion may be burned off. The water and hydrocarbon stream is treated by a dual component separator to remove undesirable particulates and a resulting vapor/gas stream is then, optionally quenched (using any known quench system or method or an adiabatic quench system according to the present invention) and then fed to a condenser for cooling from which, optionally, it is fed to cooling apparatus(es) to lower its temperature. The condenser produces a liquid stream of water and hydrocarbons (e.g. but not limited to, oil). This stream is fed to oil/water separator(s) that produces stream(s) of hydrocarbons and of water. The water may be re-used in the system. Further air pollution control can, optionally, be added such as HEPA filters and acid gas scrubbers and/or contaminants may be removed with a thermal oxidizer.

To effect vaporization of the water and hydrocarbons from the material while in the dryer, the material is heated to temperatures required to vaporize those water and hydrocarbon constituents. These temperatures are typically between 300° F. and 900° F. Material leaving the dryer is, optionally, mixed with water for cooling and added moisture.

Either indirect or direct fired dryers may be used. The use of indirect dryers (vs. direct convection type dryers) allow for higher hydrocarbon contamination in the material to be treated. Some convection dryers have operational limits between 3% and 5% hydrocarbon contamination in the material to be treated. Also, some indirect dryers do not combine the dryer burner by-product of combustion gas with steam and sweep gas, reducing the size of the condensing and particulate collection equipment.

In both stationary and portable recycling systems according to certain embodiments of the present invention hydrocarbon contaminates and water in material in a rotary dryer is treated at temperatures between 300° F. and 900° F. The hydrocarbons and water are driven off and condensed. Material is discharged as remediated from the dryer. The level of residual hydrocarbon contamination in the material after such remediation is typically in the range of 0-10,000 ppm. Cleaned material and soils are then recycled in numerous ways: re-use in original product, back-fill at the site of origin, reclaiming soil or coal pits, general clean fill, crushed soil sales, asphalt mix sales, concrete mix sales, or cover in a sanitary landfill.

In one aspect, a soil recycling facility has on-site laboratory equipment to validate that the soils are properly remediated along with proper storage arrangements for the materials awaiting processing. A remediation plant according to the present invention may include: material holding hoppers, material handling conveyors and equipment, rotary dryer(s), soil conditioner(s) (adding water), heat exchanger(s), oil/water treatment(s), particulate separation and collection, and controls. Advantages of such systems include: remediation and recycling of the soil; removal and recycling of hydrocarbons; high levels of hydrocarbon removal and state-of-the-art pollution control; reliable and cost effective option to landfill disposal; reuse of the remediated soil, water, and hydrocarbons in a variety of ways; certification of remediation of hydrocarbon contaminated soils; ability to process a wide variety of types of cuttings, soils and hydrocarbons; maintenance of the ambient air quality standards.

High moisture (water) in contaminated soil is considered to be between 15% and 25% moisture by volume in the soil to be remediated. A 6" diameter dryer can run between 3 and 6 tons per hour contaminated soil. A 9' diameter dryer can run between 12 and 15 tons per hour. Actual production depends on such variables as the specific heat of the soil, elevation of the plant, and the amount of moisture to be removed.

Systems according to the present invention may be affected by state and country permit criteria. Maximum volumes of criteria pollutants from portable or stationary systems allowed by individual states and county air regulators affect the size of the dryer. Acid such as sulfur oxide output from the stack may require a switch to low sulfur primary fuel and/or addition of a packed tower. Particulate collection beyond 0.04 GSCF may require HEPA filters. Liquid or vapor carbon collection for water and gas may be required.

In certain particular aspects of systems and methods according to the present invention, to inhibit or prevent the formation of the condensation of oil, etc. on walls and parts of a dual component separator, the separator is encased with insulating material (e.g. fiberglass, ceramic fiber, cellulose, etc.) and hot air (e.g., at least 300 to 900 degrees F.; e.g. heat from the thermal oxidizer's stack) is injected into a space between the exterior of the dual component apparatus and the interior of the insulation to maintain the temperature of the interior of the dual component system above the dew point of material being fed into the dual component separator to inhibit or prevent condensation within the separator. In one aspect a housing or enclosure is provided around the dual component separator and the insulation is installed in the housing or enclosure. Instead of or in addition to using insulating material and/or hot air, recirculating material can be heated by a separate burner or burners.

In one particular embodiment, a rotary dryer according to the present invention has an outer shell or case which internally is divided by a wall into two interior chambers. Temperature in each chamber can be controlled providing dual evaporating temperatures. This permits control over the vaporization process and more even heating of the drum and inhibits or prevents overheating of the hot end of the drum while attempting to get the cold end hot. Burners and/or fireboxes may be provided like any of those disclosed in the prior art or, according to the present invention, one or more burners are provided, either in separate fireboxes (as require by U.S. Pat. No. 5,927,970—which separate fireboxes are not the legal equivalent of burners mounted within the dryer shell or case, burners not in separate fireboxes; said patent incorporated fully herein for all purposes) or within the shell of the dryer; at one or at both ends of the shell or case. This can reduce or eliminate hot spots and flame impingement on the drum.

Certain quench systems according to the present invention operate nearly adiabatically or adiabatically. This is advantageous because the system enthalpy remains constant. These methods can employ the heat of vaporization of sprayed liquid to reduce the temperature of the input vapor stream. Such systems employing water as a quench fluid are not the legal equivalent of prior art systems that use a hydrocarbon liquid as a quench fluid, including but not limited to, hydrocarbon quench systems as in U.S. Pat. Nos. 6,120,654; 6,120,650; and 5,736,031—all incorporated fully herein for all purposes.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide new, unique, useful, and non-obvious remediation systems; and methods of their use—all of which are not anticipated by, rendered obvious by, suggested by, or even implied by any of the prior art, either alone or in any possible legal combination; and it is, therefore, an object of at least certain preferred embodiments of the present invention to provide:

New, useful, unique, efficient, non-obvious systems and methods for remediating contaminated soil from industrial processes, operations, and methods;

New, useful, unique, efficient, non-obvious systems and methods for remediating cuttings, soil, etc. from drilling fluids from drilling operations on land-based or offshore drilling rigs;

Such systems and methods that produce re-cyclable drilling fluids;

Such systems and methods that use a weir tank system;

New, useful, unique, efficient, non-obvious dryers and quench systems for such systems and methods; and, in certain particular aspects a non-hydrocarbon based quench system for quenching a vapor stream from a dryer, a separator, or from a dual component separator system;

Such systems and methods which have an adiabatic (or nearly adiabatic) quench system; and Such systems and methods that produce re-usable water and oil.

Certain embodiments of this invention are not limited to any particular individual feature disclosed here, but include combinations of them distinguished from the prior art with their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a basis or creative impetus for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 1 is a schematic view of a prior art system.

FIGS. 2A and 2B are perspective views of prior art separation systems.

FIG. 9 is a schematic view of a prior art system.

DESCRIPTION OF EMBODIMENTS PREFERRED AT THE TIME OF FILING FOR THIS PATENT

Figure 3:
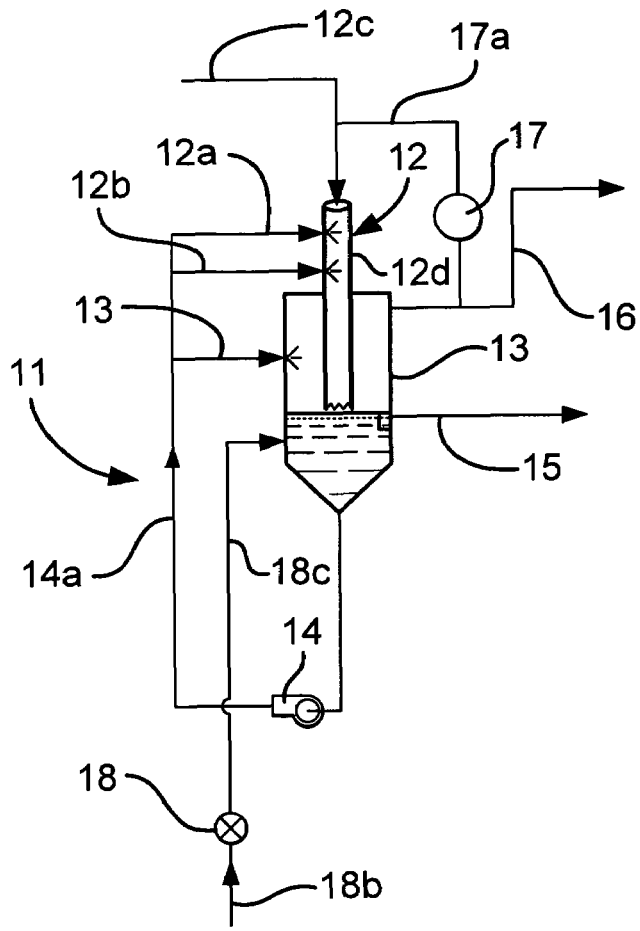
FIG. 3 is a schematic view of a quench system according to the present invention.

As shown in FIG. 1, one particular embodiment of a system 10 according to the present invention has a feed hopper 20; a dryer 30; a condenser 40; an oil/water separator 50; a rehydration system 60; a discharge 70; an exhaust stack 80; and an oil processor 90. But for additions and changes according to the present invention as described in detail below, FIGS. 1, 5, 5 and 9 describe prior art.

Initially, cuttings in a drilling fluid are processed by a rig's shaker system, producing fluid, soil, and oily contaminated cuttings and solids (collectively "oily solids"). These oily solids in a slurry of solids, oil and water are fed to the feed hopper 20 (e.g. from: an end loader; conveyor belt; auger; vacuum system from the shakers; mud cleaner, hydrocyclone and/or centrifuge).

The feed hopper may include appropriate crushers, shredders, and/or classifiers. A "grizzly unit" (i.e. a screening system with relatively large openings) may be used positioned over the top of the feed hopper. The grizzly unit removes large clay balls and/or large pieces of rubble which are sent to a shredder. Optionally, separate clay shredders (item 22 in dotted line) and/or oversized rock crushers (item 24 in dotted line) may be used to treat input to the feeder hopper. Also optionally, a heater (item 26 in dotted line) may be used to heat material in the feed hopper 20 (e.g. up to a temperature of about 212° F.) to drive off water in the feed material.

The dryer 30 (any known dryer or any indirect dryer according to the present invention) heats the oily solids to vaporize or volatilize hydrocarbons and other organic contaminants. A variety of dryers are commercially available for this purpose, including, but not limited to, Brandt drum dryers that hold an amount of material and have a gas fired burner or burners that can produce heat up to 1600° F. Any suitable dryer and/or heater may be used, including, but not limited to, commercially available thermal screw dryers, rotating drum dryers, and rotating screws within drum dryers. Available fuels for the dryer includes propane, natural gas, diesel fuel, oil, or electric power. Actual process temperatures are established depending on the vaporization and/or volatilization temperature of contaminants to be removed.

In one particular embodiment of the present invention, the system 10 processes about 2 tons per hour of a material that contains by volume up to about 25% to 30% oil, up to about 25% to 30% water, and up to about 40% to 50% drilled solids. These percentages may vary in certain embodiments of the present invention by 95%, plus or minus. Processed tons per hour may vary depending on specific heat of the material to be processed, elevation of the rig, and amount of moisture to be removed.

Solid treated material, including but not limited to sterile soil and/or sterile debris, is fed to the rehydration system 60. Water (including, but not limited to, water from the oil/water separator 50) is added to the sterile material to control dust during handling and/or discharge of the sterile material. If permitted, the discharge 70 directs the material overboard from an offshore rig. Alternatively, the discharge 70 conducts the material to a boat, barge, or container or to a pit or landfill.

The rehydration system 60 may be any suitable commercially available rehydrator, including, but not limited to, suitable rehydration chambers, auger systems and pug mills. Fine mist sprays may be used with or in any such system. A variety of commercially available prior art nozzle spray systems may be used.

The heater dryer 30 exhausts a vapor stream with oil and water to a dual component separator 42, optionally to a quench system 41, and then to a condenser 40. The dual component separator 42 before the condenser removes contaminating fines, e.g. particles with a smallest dimension of 0.4 microns. These fines (line 42a) may be disposed of, collected, and/or may flow to the rehydration system 60. A heat exchange subsystem 44 (within the condenser system or apart from it) cools the vapor, e.g. down to 100° F. or lower. In one aspect the heat exchange system is a typically plate/fin system and the heat exchange medium is air pumped by fans. The cooled vapor liquid stream (preferably with most or all fines removed) is then pumped to the oil/water separator 50. The quench system 41 may be any suitable known quench system or any quench system according to the present invention described herein.

The oil/water separator 50 separates the feed from the heat exchange subsystem 44 into a water stream 52 which, in one aspect, is fed to the rehydration system 60; and an oil stream 54 which, in one aspect is fed to the oil processor 90. The oil processor 90 sends the oil from the oil/water separator 50 to storage on the rig; to shipping containers; to a mud additive system; and/or to fuel tanks, e.g. but not limited to, for use as fuel for the heater dryer. Any suitable known oil/water separator may be used. Alternatively, the water stream is returned to the drilling fluid or, in a line 56, for evaporation in the exhaust stack 80, or can be used to rehydrate processed dirt. Alternatively, the oil is returned in a line 58 to the heater dryer 30.

Heat and exhaust from burners of the heater dryer 30 in a line 81 vents through the exhaust stack 80. Steam and/or hot fluid may be provided in a line 82 to the feed hopper 20 to heat its contents from a heat exchange system 83 which, in certain aspects, has a closed loop fluid flow coil inside and/or outside of the stack 80 disposed in heat exchange relationship to the hot stack exhaust The dual component separators of FIGS. 2A and 2B can, according to the present invention, be used in methods according to the present invention. FIG. 2A shows a prior art dual component separator system SY which has a fan FN that propels material DG input in a line IL (e.g. vapors with solid contaminants entrained therein or "dirty gas") to a core separator CS. Cleaned material CM or "clean gas" exits from the top of the core separator CS through a cylinder or "vortex finder" CL and separated solids SD are propelled (and recirculated) by the fan FN to a cyclone CY. Material flows from the top of the cyclone CY in a recirculation line RL back to the input line IL and separated solids flow down into a hopper HP. Any known cyclone which is properly sized according to the present invention may be used.

FIG. 2B shows a prior art dual component separator like the Core Separator System commercially available from LSR Technologies, Inc. of Acton, Mass. Material to be processed PF flows into an inlet IT (pulled or pushed in by a fan). The inlet stream is divided to flow to a plurality of core separators CP within a housing HO. Cleaned material CF (vapor and/or gas) exits from the core separators and flows out through top outlets OT and bottom outlets OU. A stream with solids separated by the core separators flows to a plurality of cyclones CC (e.g., four on each side of the system) from which separated solids SL exit downwardly and vapor and/or gas exits in recirculation lines FLA and FLB for recirculation by the fan FA through the core separators. Each core separator has a cylindrical unit with a single inlet for the material to be treated and two outlets for cleaned gas. The core separators thus concentrate solid particles at the periphery and cleaned gas exits from the top and bottom thereof. The formation of toroidal vortices are avoided in the core separators and low particle entrainment results in high efficiency. The recirculation loop maintains a desired high velocity in both the core separators and the cyclones to enhance separation efficiency and to minimize cut point for all process volumes.

FIG. 3 shows a quench system 11 according to the present invention which is, preferably, a nearly-adiabatic or an adiabatic system, i.e., there is little or no flow of heat to or from the system and no fuel is required. Hot material (e.g., but not limited to, a hot vapor and/or gas stream with or without entrained dust and/or solids from a thermal dryer or from a dual component separator) via a line 12c enters an inlet 12 of a vessel 13. Liquid level within the vessel 13 may be controlled by a weir. Cooling material, e.g., but not limited to water at or at about the process temperature, is sprayed into the hot material both within an upper part 14 of the inlet 12 via lines 12a, 12b and/or into material within the vessel 13 via a line 13a. These sprays (a part of which are vaporized) cool the hot material, most of which vaporizes and some of which condenses and is collected as liquid in the bottom of the vessel 13. Optionally, a pump 14 pumps and recirculates quench liquid in a line 14a to the spray lines 12a, 12b, and 13a. The collected liquid is pumped from the vessel 13 in an exit line 15. Vapor and/or gas is pumped or sucked from the vessel 13 in a line 16. A pressure gauge 17 in a line 17a indicates pressure drop across the vessel 13. A valve 18 controls fluid flow in a line 18c. Fluid may pumped from a clarifier or oil/water separator in the line 18c to the vessel 13 (in one aspect, pumped at one third of the rate of recirculation by pump 14; and in another aspect about 51 gallons per minute at about 160 degrees F. is pumped into line 18c and about 52 gallons per minute at about 203 degrees F. exits the vessel 13 in the line 15). In one typical operation vapor (e.g., with entrained solids or dust) flows from a thermal dryer at about 948 degrees F. to the inlet 12; water at about 193 degrees F. is sprayed into the hot material; liquid, primarily water exits from the bottom of the vessel 13 at about 193 degrees F.; and vapor exits from the top of the vessel 13 at about 203 degrees F.

Figure 4B:
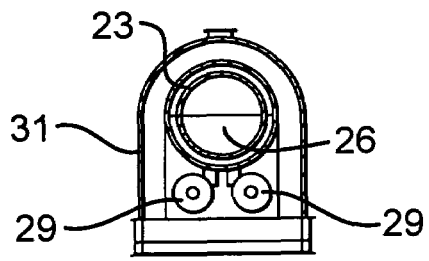
FIG. 4B is a partial cross-section view of the dryer of FIG. 4A.
Figure 4A:
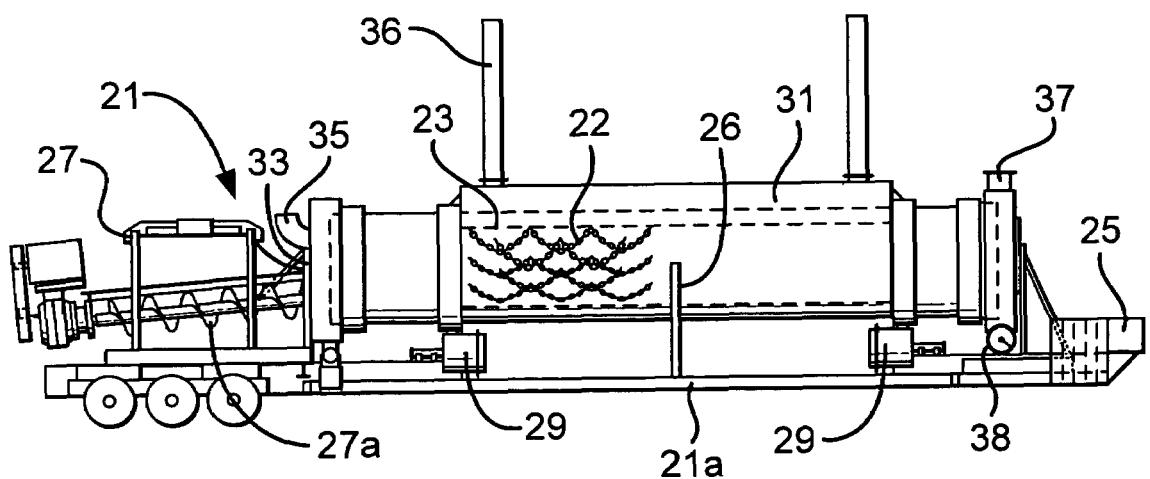
FIG. 4A is a schematic side view of a dryer system according to the present invention.

FIGS. 4A and 4B show a dryer system 21 according to the present invention which has a dryer vessel 23 in a housing 31 mounted on a trailer 25 (although the system is mountable on any suitable structure or apparatus). A feed system 27 has a feed auger 27a that moves material to be dried into an inlet 33a of the vessel 23. Burners 29 are located at opposed ends of the vessel 23. Vapors and/or gas resulting from heating of material heated by the burners 29 in the vessel 23 exit through an outlet 35. Material is exhausted through stacks 36 and solids are discharged with a discharge auger 38 from a discharge plenum 37. Chains 22 are hung in a semicircular hanging shape from the interior of the vessel 23 to inhibit caking of particles on the vessel 23's interior wall and to scrape the walls to facilitate particle flow through the dryer system 21. Any suitable known chain or chains maybe used. A wall 26 that extends upwardly from a base 21a (but does not extend to the top of the vessel 23) divides the vessel 23 into two heating zones, each with its corresponding burner 29, so that, if desired different temperatures may be achieved in each zone and more precise temperature control is possible.

Figure 5:
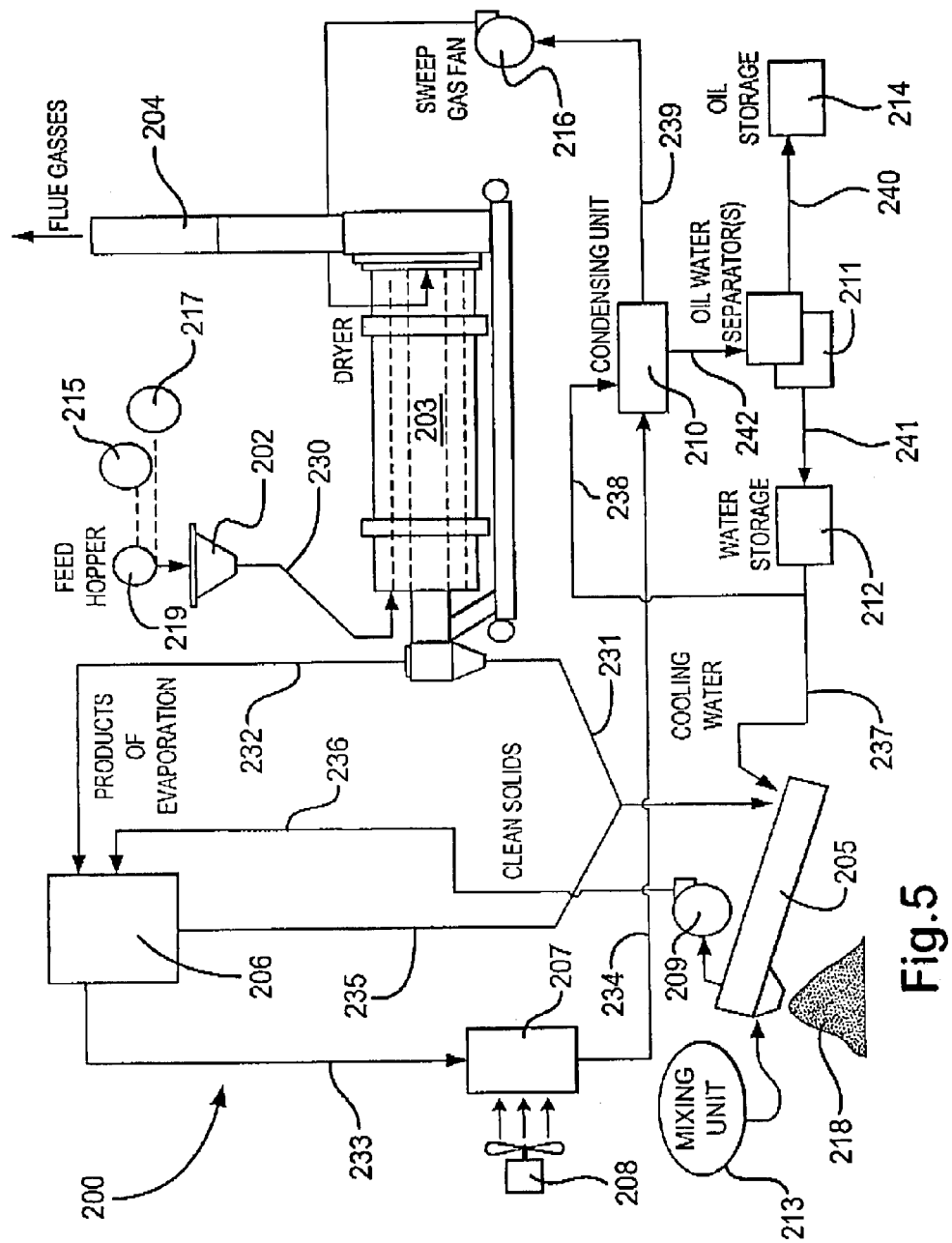
FIG. 5 is a schematic view of a prior art system.

FIG. 5 shows a system 200 according to the present invention. A mixture of liquid, cuttings, etc. from a wellbore is fed to a hopper 202 from which it flows in a line 230 to a thermal treatment system 203 (e.g. any such system previously described herein and including, but not limited to, any suitable commercially available indirect or direct fired dryer system). An optional grizzly unit 219 may be used over the hopper 202 which is preferably self-relieving (e.g. via vibration) and/or has a remotely actuable dump apparatus. Thus as an end loader charges the feed hopper 202 (which in one aspect is "cold") large clay balls and large pieces of rubble are discharged (e.g. to the ground) instead of entering the hopper 202. An optional clay shredder 215 and/or rock crusher 217 may be used.

The thermal treatment system 203 produces an exhaust stream that is exhausted through a flue 204; a stream of solids 231 that is fed to rehydration apparatus 205; and a stream of gasses 232 that is fed to a dual component separator system 206 for removal of fine particulates. Optionally, the cuttings in the line 231, which may be relatively hot are mixed with water in a mixing unit 213 and then fed to rehydration apparatus 205. The rehydration apparatus 205 produces a mass 218 of separator solids. Dust and steam in a line 236 propelled by a blower or fan 209 is introduced to the dual component system 206. Augers or other suitable conveyors move the cuttings through the system; e.g. from the hopper 202 to the system 203; from it to the rehydration apparatus 205; from the rehydration apparatus 205 to the system 206. Preferably, the system 205 is a sealed system.

Solid particulates from the system 206 flow in a line 235 to the rehydration apparatus 205 and gasses flow in a line 233 to be cooled in a heat exchanger 207 e.g. down to about 100 degrees F. A cooling fan 208 provides cool air to the heat exchanger 207. The cooled gasses and liquid flow in a line 234 to a condensing unit 210 which produces an exhaust gas stream 239 that flows back to the thermal treatment system 203, propelled by a fan 216; and a liquid stream, e.g. with oil and water therein, that flows in a stream 242 to one or more oil/water separators 211.

Water produced by the oil water separator 211 flows in a line 241 to a water storage apparatus 212 and produced oil flows in a line 240 to an oil storage apparatus 214.

Water from the water storage apparatus 212 may be re-cycled in a line 238 to the condensing unit 210 and/or fed in a line 237 for use in the rehydration apparatus 205. The system 200 may be land-based or used on an offshore rig.

Figure 6:
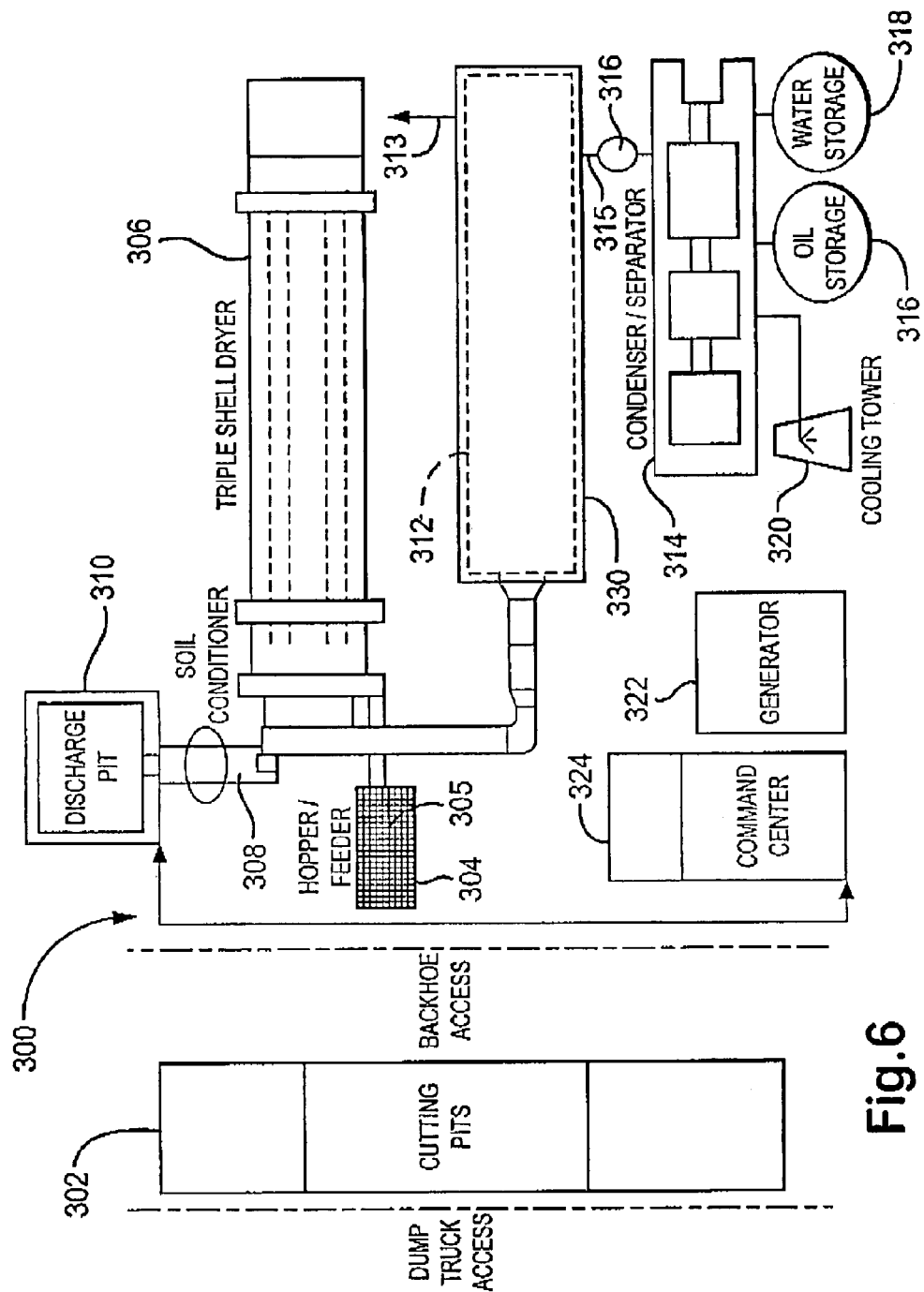
FIG. 6 is a schematic view of a prior art system.

FIG. 6 shows a system 300 according to the present invention. Cuttings, liquid, etc. from cuttings pits 302 having both dump truck access (for trucks to dump material in from a wellbore; alternatively a pump/conduit system may be used) and backhoe access (for backhoes to charge a hopper feeder 304; alternatively a pump/conduit system may be used) are fed to the hopper feeder 304 from which they are conveyed to a thermal dryer 306. An optional grizzly unit or other suitable pre-screening apparatus (e.g. a shaker) 305 may be used on the feeder hopper 304 (as is the case with any embodiment disclosed herein). The dryer 306 (e.g. any thermal treatment system disclosed herein) produces solids which are fed to a soil conditioner 308 which rehydrates the solids and whose output conditioned material is fed to a discharge pit 310. Liquid/gas material from the dryer 306 is fed to a dual component separator system 312 that produces a discharge stream 313 of solid particulates and a stream of gas 315 that is fed, optionally to a quench system 316, and to an oil condenser/water separator system 314. Oil produced by the system 314 is fed to oil storage apparatus 316 and produced water is fed to water storage apparatus 318. Gases from the system 314 are fed to a cooling tower 320 and may be re-used in a heat exchanger 330.

A generator 322 provides power for various pumps, fans, and system components (e.g. electrical components and air compressors. All system components may be interconnected with and/or in communication with a command center 324 from which they may be controlled.

Various heli-transportable systems according to the present invention remediate 3-5 tons per hour of wellbore cuttings material. Various mobile systems (e.g. two/three tractor trailer loads) process 7-15 tons/hour. Larger systems (e.g. five/seven tractor trailer loads) process 20 to 30 tons/hour and large stationary systems process 50 to 100 tons per hour.

At a water content in the wellbore cuttings material of about 2%, in one aspect, an offshore unit according to the present invention can process about 5 tons/hour; a small mobile unit about 12 tons/hour; a mobile unit with a 7' diameter dryer, about 20 tons/hour; and a mobile unit with a 9' diameter dryer about 30 tons/hour. At about 20% water content, production is as follows: offshore unit, about 3.5 tons/hour; small mobile unit about 6.5 tons/hour; 7' dryer unit about 9.5 tons/hour; and 9' dryer unit about 20 tons/hour. At about 38% water content, production is as follows: offshore unit, about 1.2 tons/hour to 1.5 tons/hour; small mobile unit, about 2.4 tons/hour; mobile 7' dryer unit, about 4.0 tons/hour; and mobile 9' dryer unit, about 8.0 tons/hour.

The present invention, therefore, in at least certain preferred embodiments, provides a method for remediating wellbore cuttings, the method including transporting a system for remediating the cuttings to a rig site, the system including a thermal treatment system and a condensing system, feeding a slurry of the cuttings with oil and water to the thermal treatment system and heating the cuttings therein producing heated cuttings and a gas stream with oil and water, discharging the heated cuttings from the thermal treatment system, feeding the gaseous stream with oil and water to a condenser system producing a liquid stream, and feeding the liquid stream to an oil/water separator producing an oil stream and a water stream; any such method wherein an initial mixture of wellbore cuttings, oil, water and drilling fluid is fed to a shaker system, the method including producing the slurry of cuttings, oil and water with the shaker system; any such method including, prior to feeding the slurry to the thermal treatment system, feeding the slurry through a separator system to a hopper, separating large pieces of material from the slurry with the separator system, and then feeding the slurry from the hopper to the thermal treatment system; any such method wherein the slurry contains by volume up to about 25% oil, up to about 25% water, and up to about 50% cuttings and the method processes about 2 tons per hour of slurry; any such method wherein the slurry contains by volume about 38% water and the method processes about 1.2 tons per hour of slurry; any such method wherein the slurry includes particulates and the system includes a dual component separation system for separating particulates, the method including prior to feeding the stream with oil and water to the condenser system, feeding the stream with oil and water to the dual component separation system, and separating out solid particulates from the stream with oil and water; any such method wherein the slurry has hydrocarbon contaminants therein and the method includes volatilizing the hydrocarbons contaminants in the thermal treatment system to separate them from the slurry; any such method wherein the slurry has volatilizable contaminants therein and the method includes volatilizing the volatilizable contaminants in the thermal treatment system to separate them from the slurry; any such method wherein the system includes heat exchange apparatus and the method includes cooling the liquid stream to 100° F. or lower prior to feeding it to the oil/water separator; any such method including feeding the oil stream from the oil/water separator to the thermal treatment system for fuel for the thermal treatment system; and any such method wherein the system includes rehydration apparatus and the method includes rehydrating the discharged heated cuttings with the rehydration apparatus to facilitate handling of the heated cuttings.

The present invention, therefore, in certain aspects, provides a method for remediating wellbore cuttings from a wellbore, the method including feeding a slurry of the cuttings with oil, fine particulates, and water to a thermal treatment system and heating the cuttings therein producing heated cuttings and a stream with oil and water, discharging the heated cuttings from the thermal treatment system, feeding the stream with oil and water to a dual component separation system, separating out solid particulates from the stream with oil and water, feeding the stream with oil and water to a condenser system producing a liquid stream, and feeding the liquid stream to an oil/water separator producing an oil stream and a water stream.

A system 100 according to the present invention is illustrated in FIGS. 7' and 7". Material to be treated is fed to an inlet 188 of a feed system 102 which includes a feed auger 189 for moving the material into a rotary dryer 101. Any contaminated material may be treated with the system 100 (e.g., but not limited to, material contaminated with volatile organic compounds, soil contaminated with hydrocarbons, drilling cuttings contaminated with diesel, oil etc.).

In the rotary dryer the material is heated to vaporize or burn off contaminants by one or more burners 190. Any suitable known dryer may be used or, alternatively, a dryer according to the present invention may be used, e.g., but not limited to, a dryer as in FIG. 4A.

In one particular aspect, drilled cuttings from a wellbore drilling operation are fed to the inlet 188, either on-site at a drilling rig or off site and remote from the rig. One type of such cuttings contain water, oil (diesel), drilling mud, sand, shale, clay, bentonite and/or debris (in various combinations). In one aspect these cuttings are heated to about 675 degrees F. and in other aspects to a temperature within the range of 600 to 900 degrees F. A stream of "cooked" solids exit from a solids outlet 191 and flow in a line 142 through an airlock 115 (to keep oxygen out of the system) to a line 147 and from it, optionally, to a mill 110 (e.g. a rehydration pug mill for mixing water and hot dry solids) and then to a collection point 192. A gaseous vapor produced in the heating of the material exits from an outlet 192 and flows in a line 139 to an inlet 193 of a dual component separator 103. Optionally, the dual component separator 103 is insulated with encasing insulation 194 to maintain a desired temperature range therein and/or to inhibit or prevent unwanted material condensation in the dual component separator 103's interior spaces. Byproducts of combustion flow out from the exhaust stacks 118 of the dryer 101. Air for the burners 190 is provided through a line 195. An inlet filter 117 filters the air to remove debris, bugs, birds, etc. and an air blower 116 moves the air to the burners 190. Fuel for the burners 190 is provided through a line 145. Fuel flows in a line 144 (e.g., but not limited to, from an oil tank 137 described below) to a storage tank 119 and from this tank a pump 112 pumps the fuel through a strainer 113 to remove relatively large debris through a filter 114 to remove relatively small debris and then through the line 145 to the burners 190. An optional heater 111 preheats air for the dual component separator 103. Alternatively vapor and/or gas for recirculation is passed through a heat exchanger for heating with gas from a thermal oxidizer.

Dust and/or other entrained solids separated from the input feed material by the dual component separator 103 flow in a line 143, through an airlock 138 to the line 147 and then to the mill 110 and collection point 192. In certain aspects dust particles with a size less than 0.5 microns are removed by the dual component separator 103. Instead or in addition to the mill 110, when operating offshore with a system according to the present invention, a high volume liquid mixer or similar apparatus is used to hydrate the solids with seawater.

A hot, relatively dust-free vapor stream flows from an outlet 196 of the dual component separator 103 in a line 140 to an inlet cylinder or chamber 120 of a quench system 104. Any known quench system or cooling apparatus may be used to cool the stream flowing in the line 140. Alternatively, a quench system 104 according to the present invention may be employed as shown. Preferably the system 104's enthalpy (heat content) remains constant or substantially constant and preferably little or no heat flows to or from the system. Within the inlet 120 cooling fluid, e.g. water or a stream that is substantially water and substantially oil free (in certain aspects at a temperature ranging between 180 and 200 degrees F.) is sprayed into the incoming vapor stream (sprayed e.g. by multiple nozzles, e.g. in one aspect six nozzles). For example, each of the cooling fluid lines 185, 186 may feed three spaced-apart sprays within the inlet 120 producing a fine spray. Optionally, or instead of sprays within the inlet 120, one or more sprays or cooling fluid fed from a line 184 are sprayed into a vessel 121 into which the inlet 120 projects (in one aspect, for dust abatement). Condensed liquid (e.g., but not limited to, condensed liquid oil and water) flows down to the bottom of the vessel 121 and liquid overflow exits in an exit line 197 for flow to a liquid/solids separator 108. Condensed water within the vessel 121 may, optionally, be pumped by a pump 122 in a line 183 to the lines 184-186. Optionally, water or cooling fluid from another source (not shown) of sufficient size and capacity is fed into the line 183.

Quenched vapor (e.g. with oil and water) which did not condensed within the quench system 104 flows in a line 178 to a condenser 105. In one particular aspect a shell-and-tube condenser is used for the condenser 105. The condenser 105 produces a liquid stream that is pumped by a pump 130 in a line 180 to the liquid/solid separator 108.

Cooled heat exchange fluid for the condenser 105 is provided by a system that includes a cooler 106 (e.g., but not limited to, a heat exchanger or cooling tower). A pump 176 pumps cooled heat exchange fluid (e.g., but not limited to, water) in a line 175 to the condenser 105, through the condenser 105, to a line 177, and then back to the cooler 106. Makeup cooling fluid may be supplied to the cooler 106 in a line 172 and removed water or "cooler blowdown" (e.g. 3 to 5 gpm) flows from the cooler in a line 174. This water may be fed to a tank 136. Saturated air is exhausted in line 173.

In one particular embodiment vapor from drilled cuttings enters the condenser 105 at about 203 degrees F. and liquid (e.g. oil and water) exits the condenser in line 180 at about 90 degrees F. If any noncondensables (e.g. light hydrocarbons with a flash point lower that the condenser exit temperature, e.g., but not limited to, benzene and solvents) are present within the condenser 105, they are moved by a fan 127 (e.g. an "I.D." or induced draft fan) through a demister 126 (optional) in a line 171 through an optional flame arrestor 165 to a thermal oxidizer 107. A check valve 166 is in the line 167. Optionally, a standby fan circuit may be provided with lines 169; 170; standby fan 128, and a check valve 168. An air blower 129 provides air in a line 161 for combustion within the thermal oxidizer 107 and combustion fuel is provided in a line 162. Exhaust gases exit in a line 163 from the thermal oxidizer 107. The fan(s) 127 and/or 128 provide a suction that moves vapor from the rotary dryer 101, through the dual component separator 108 and quench system 104, and through the condenser 105 to the thermal oxidizer 107.

The liquid/solid separator 108 receives a liquid overflow exit stream from the quench system 104 in the line 197 and the exit stream from the condenser 105 in the line 180. Water separated from these inlet flows by the liquid/solid separator 108 flows in a line 156 to an oil/water separator 109 and in a line 181, pumped by a pump 125 to the line 182 for use in the quench system 104. In one particular aspect when vapor from drilled cuttings is fed to the quench system 104, water at about 160 degrees F. is provided in the line 182. Process water may also, optionally, be supplied via a line 179 from the separator 108 to the condenser 105. In one particular aspect when the system 100 is processing drilled cuttings, cooling water at about 180 degrees F. is provided in the line 179 to the condenser 105. The volume of water returned to the condenser in line 179 helps to maintain a desired water temperature in the separator 108. A valve 124 controls flow in and to the line 179 and a valve 123 controls flow in and to the line 182.

Oil (e.g. diesel and/or other hydrocarbon material) separated by the liquid/solid separator 108 flows (e.g. by gravity or it is pumped) in a line 157 to an oil sump 132. Separated solids (e.g., but not limited to, hydrocarbon or oil sludge) is pumped in a line 154, to a line 153, through a pump 133 for a feed stock pit and/or feed supply in a line 155.

Optionally, particularly if the water in the line 156 has hydrocarbons therein, it is fed to a separator 109 (e.g., but not limited to, any known suitable slant bed/coalescing liquid separator). The separator 109 produces water which exits in a line 152 and is pumped by a pump 135 from a water sump 134 in a line 151 to a water retention tank 136; solids, e.g., hydrocarbon sludge which exits in a line 153 as described above; and oil in a line 158 which flows to the oil sump 132.

Water from the water retention tank 136 flows in a line 150 to a storage apparatus (not shown) and in a line 149 to a line 148 to the pug mill 110 for rehydration. A pump 131 pumps oil (or other recovered hydrocarbon liquid) from the oil sump 132 in a line 159 to an oil retention tank 137. Oil flows in a line 160 to a storage apparatus (not shown).

Figure 7I:
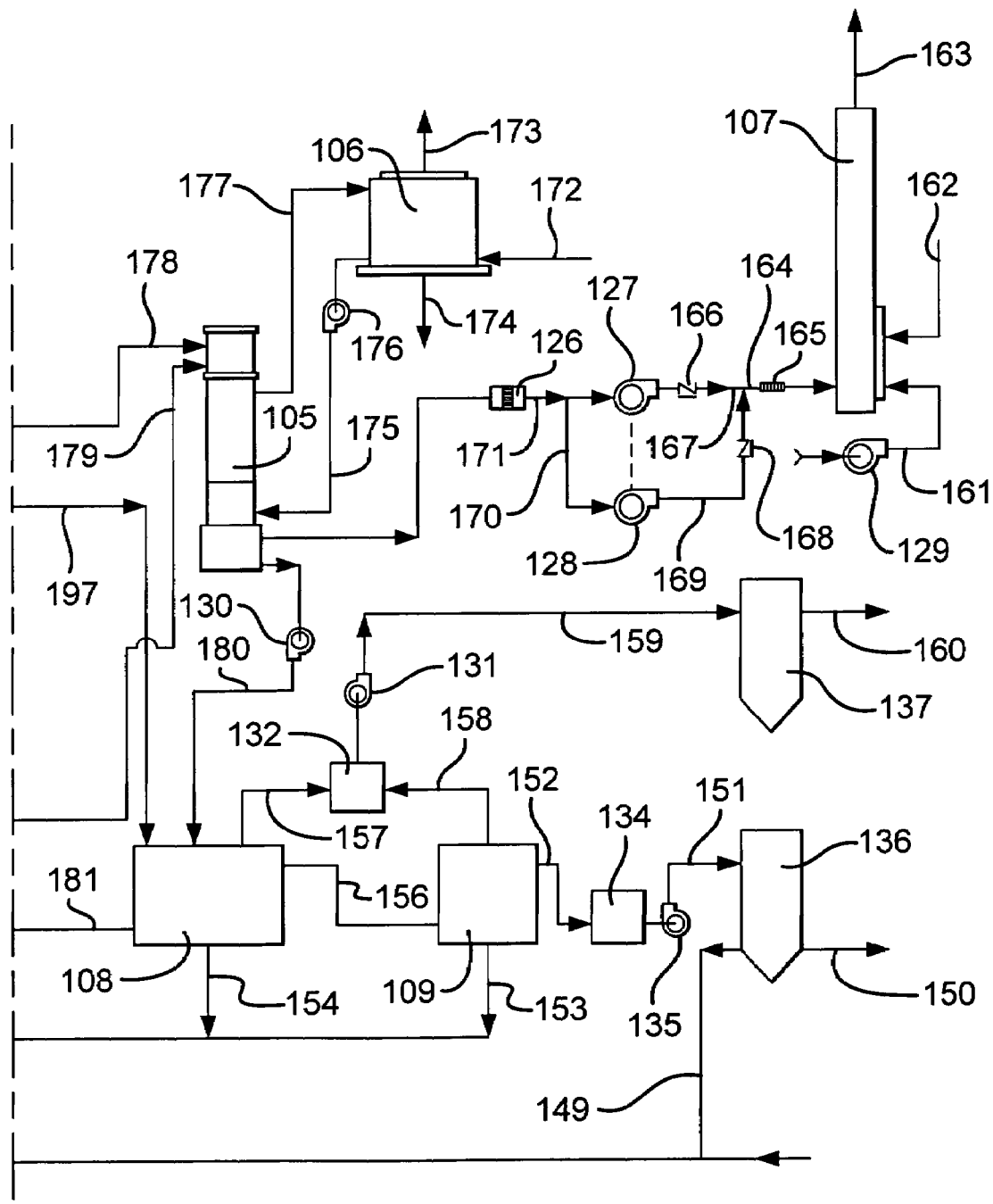
FIG. 7' is a partial schematic view of a system according to the present invention.
FIG. 7A' is a partial schematic view of a system according to the present invention.
Figure 7A:
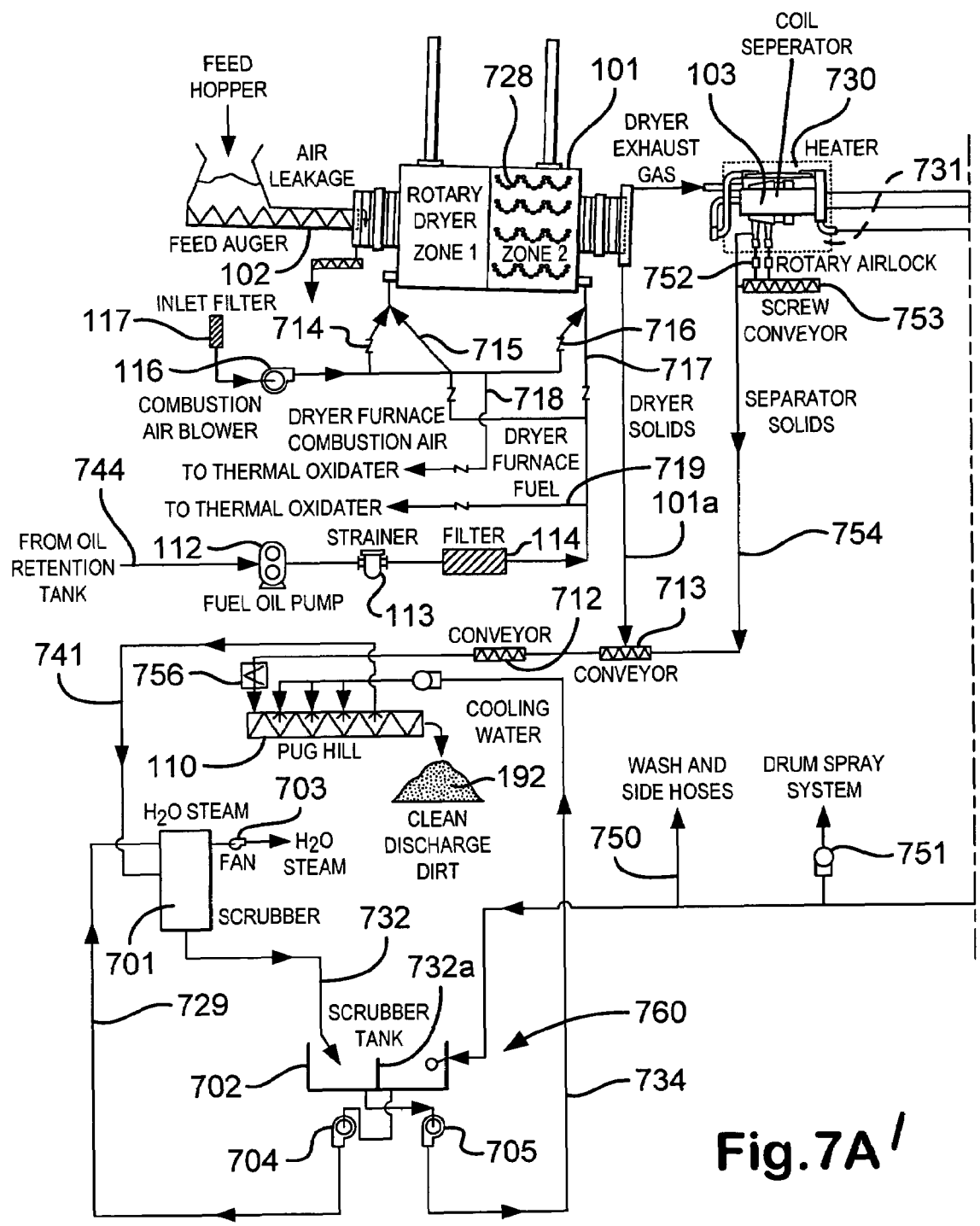
Figure 7A:
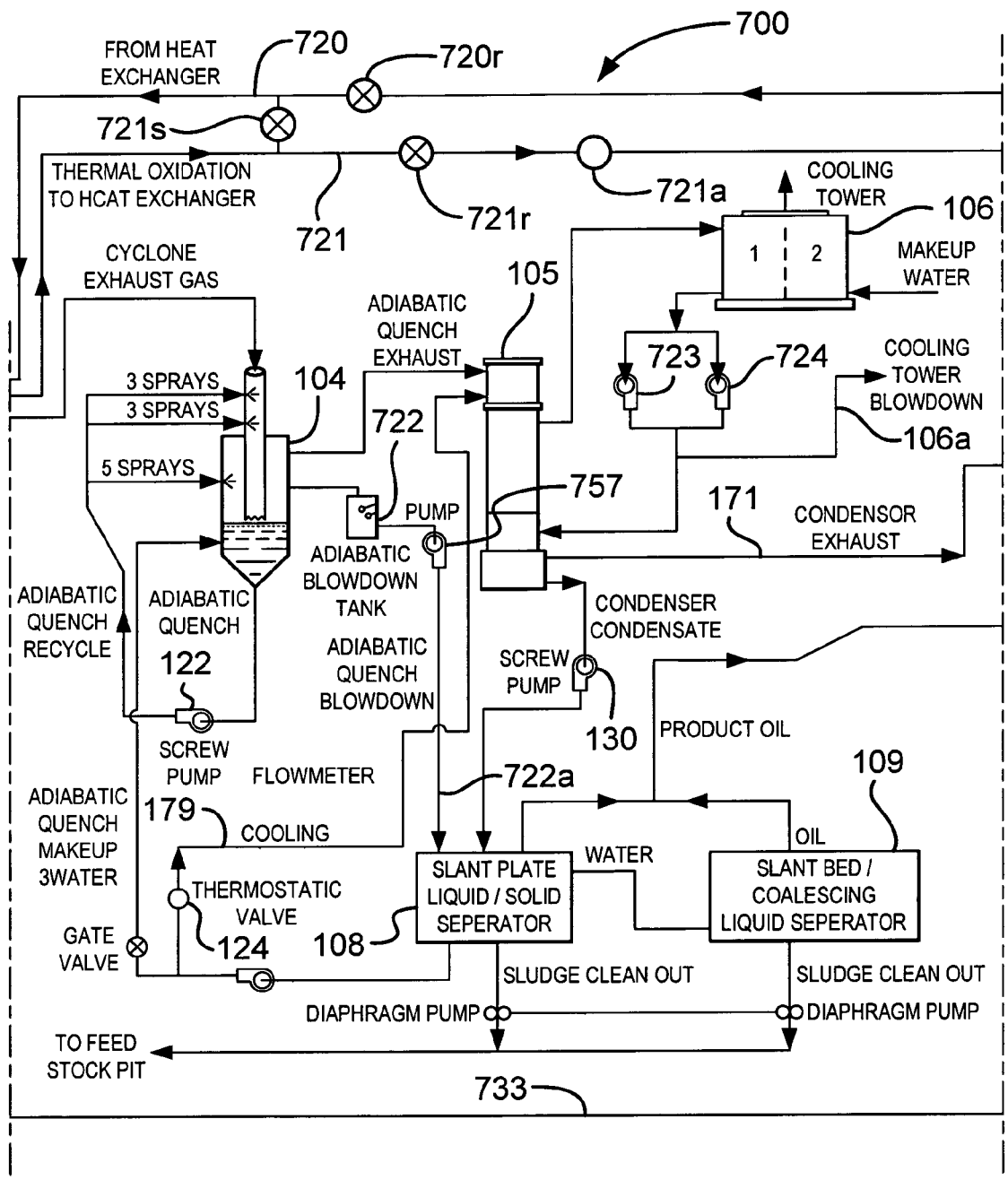
Figure 7A:
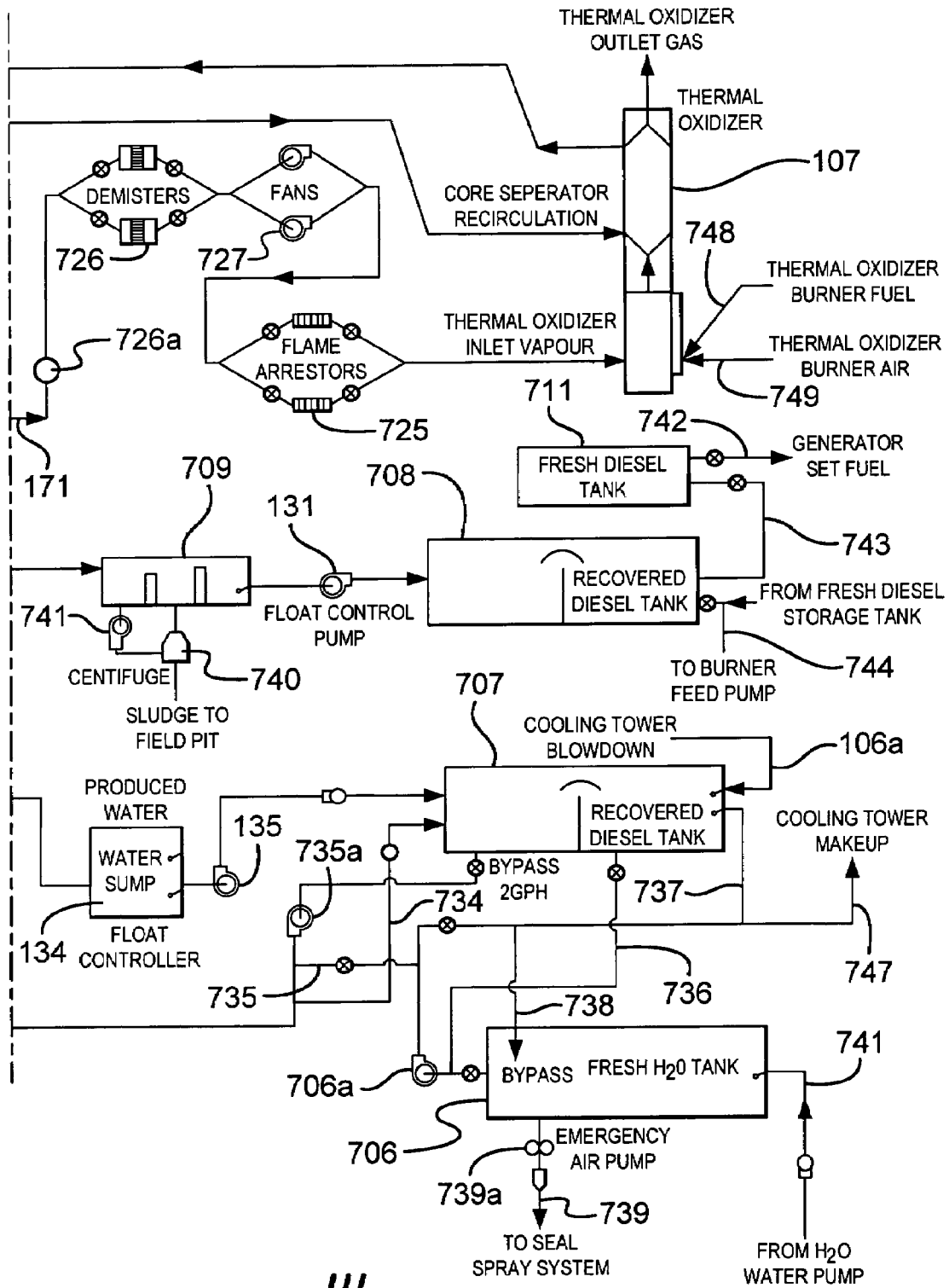

FIGS. 7A'-7A''' show a system 700 according to the present invention similar, in some aspects, to the system 100, and like numerals indicate like parts, apparatuses, lines, items, etc. The system 700 differs from that of system 100, inter alia, in that: the system 700 has a centrifuge 740 for cleaning diesel produced by separators 108, 109; heat supplied to the dual component separator 103 by a stream in heat exchange relation with a heat exchanger 710 in the thermal oxidizer 107; an optional recirculation circuit for providing a recirculation loop (which may be used in any system according to the present invention) for the dual component separator 103; a scrubber system 760 with a scrubber 701 that removes dust and/or steam from the feed to the mill 110. Insulation 731 around the dual component separator 103 in a housing or enclosure 730 inhibits or prevents unwanted condensation within the dual component separator 103. Other differences between the systems 100 and 700 are discussed below.

Solids separated by the dual component separator 103 flow through a rotary airlock 752 to a screw conveyor 753 which moves them (line 754) to a conveyor 713. Solids from the dryer 101 flow in a line 101a to the conveyor 713 and from there to a conveyor 712 which moves the solids through an airlock 756 to the mill 110.

The scrubber system 760 receives exhaust (e.g. with dust and/or steam) from the mill 110 in a line 741 which is fed to the scrubber 701. A fan 703 exhausts clean air from the scrubber 701 to the atmosphere or to additional collection and/or treatment apparatus. Water from the scrubber 701 flows in a line 732 to a tank 702 which is divided by a wall or weir 732a. Water flowing over the weir 732a is relatively clean compared to the water flowing into the tank 702 in the line 732. The fan 703 also sucks the exhaust from the mill 110 in the line 741. Any suitable known scrubber may be used; and, in one aspect, a scrubber with internal sprays spraying about 50 gallons per minute of clean water is used. A pump 705 pumps water from the left side of the tank 702 in a line 734 for spraying into the mill 110 to facilitate its operation. A pump 704 pumps clean water from the right side (as viewed in FIG. 7A) of the tank 702 in a line 729 for use in the sprayers in the scrubber 701. Clean water from the tank 707 is pumped by a pump 735a in a line 733 to the clean water side of the tank 702. (The circled X's in various lines in FIGS. 7A'' and 7A''' indicate valves and/or check valves for controlling flow in those lines.) Line 750 provides, optionally and as needed, washdown cleaning water for parts, apparatuses, and components of the system and water for fire control. Water in line 751 provides, as needed, relatively cool water for cooling an end, ends, zone, or zones of the dryer 101 and/or to hydrate the feed to the dryer 101.

Vapor from the core separator 103 flows in a line 721 to a heat exchanger 710 in the thermal oxidizer 107, e.g. at about 700 to 900 degrees F. This vapor is heated about 10 to 50 degrees F. (in one aspect the temperature is increased about 25° F.) in the heat exchanger 710 and then flows in a line 720 back to the dual component separator 103 and is fed into the separator 103 at its inlet feed. Optionally, by closing valves 720r and 721r and opening valve 721s, the lines 720, 721 provide a recirculation loop to effect recirculation (e.g. as described above for the systems of FIGS. 2A and 2B) of material for the dual component separator 103 (with line 720's inlet and line 721's outlet located to effect such recirculation). The thermostatic valve 124, by letting water from the separator 108, in line 179, flow to the condenser 105, assists in controlling the temperature in the condenser 105.

Optionally a chiller system 726a, e.g. with a heat exchanger and chiller, may be used in the line 171 from the condenser 105 (and, optionally, the demister or demisters 726 may be deleted) to reduce the temperature of the material in the line 171, e.g. from about 80° F. to 60° F. in one aspect, to condense more of the hydrocarbons in the line thereby reducing the load on the thermal oxidizer. As does the pump 176, FIG. 7, pumps 723, 724 pump cooling liquid from the cooler 106 to the condenser 105. A blowdown tank 722 serves as a catch basin for liquid overflow from the quench system 104 and a pump 757 pumps liquid from the tank 722 to the separator 108 in a line 722a. A pump 706a pumps water in a line 747 from the tank 706 to the cooler 106. An air driven pump 739a pumps, as desired and in one aspect in a no-power or emergency situation, water in a line 739 to the dryer 101. Water from an adjacent well or reservoir is provided to the tank 706 in a line 741.

Demisters 726 correspond to and operate like the demister 126, described above. Fans 727 correspond to and operate like the fan 127, described above. Flame arresters 725 correspond to and operate like the flame arrestor 165, described above.

An oil sump 709 is like the oil sump 132, FIG. 7". A pump 741 pumps material from the oil sump 709, e.g. material with oil and contaminants such as solids and sludge, to a disc centrifuge 740, e.g. any known suitable centrifuge for purifying a stream with oil etc. in it, including, but not limited to, suitable known disc centrifuges. Cleaned oil is fed back into the oil sump 709 and separated contaminants are flowed or pumped to a collection point or sludge pit. The pump 131 pumps oil (e.g. diesel and/or other hydrocarbons) from the oil sump 709 to a tank 708. A tank 711 for cleaned oil (e.g. diesel) may be used as an auxiliary fuel supply for generators, dryer, etc. A line 742 can provide fuel to any generator in the system. A line 744 can provide fuel to the burners of the dryer 101. Fresh fuel may be supplied from a diesel tank 711 in a line 743 into the tank 708.

Water from the separator 109 flows to a sump 134 and a pump 135 pumps it from the sump 134 to a tank 707.

Cooling tower blowdown water flows in a line 106a to the tank 707. A line 734 is a bypass line which permits the pump 735a, as described, to run continuously. A line 735 provides a secondary process water supply line for tanks 706, 707. A line 738 provides a bypass line which permits the pump 706*a*, as desired, to run continuously. Process water is pumped in the line 737 by the pump 706*a* to the tank 707. A line 736, with appropriate valve apparatus, makes it possible to use the pump 706*a* instead of the pump 735*a*.

Figure 8:
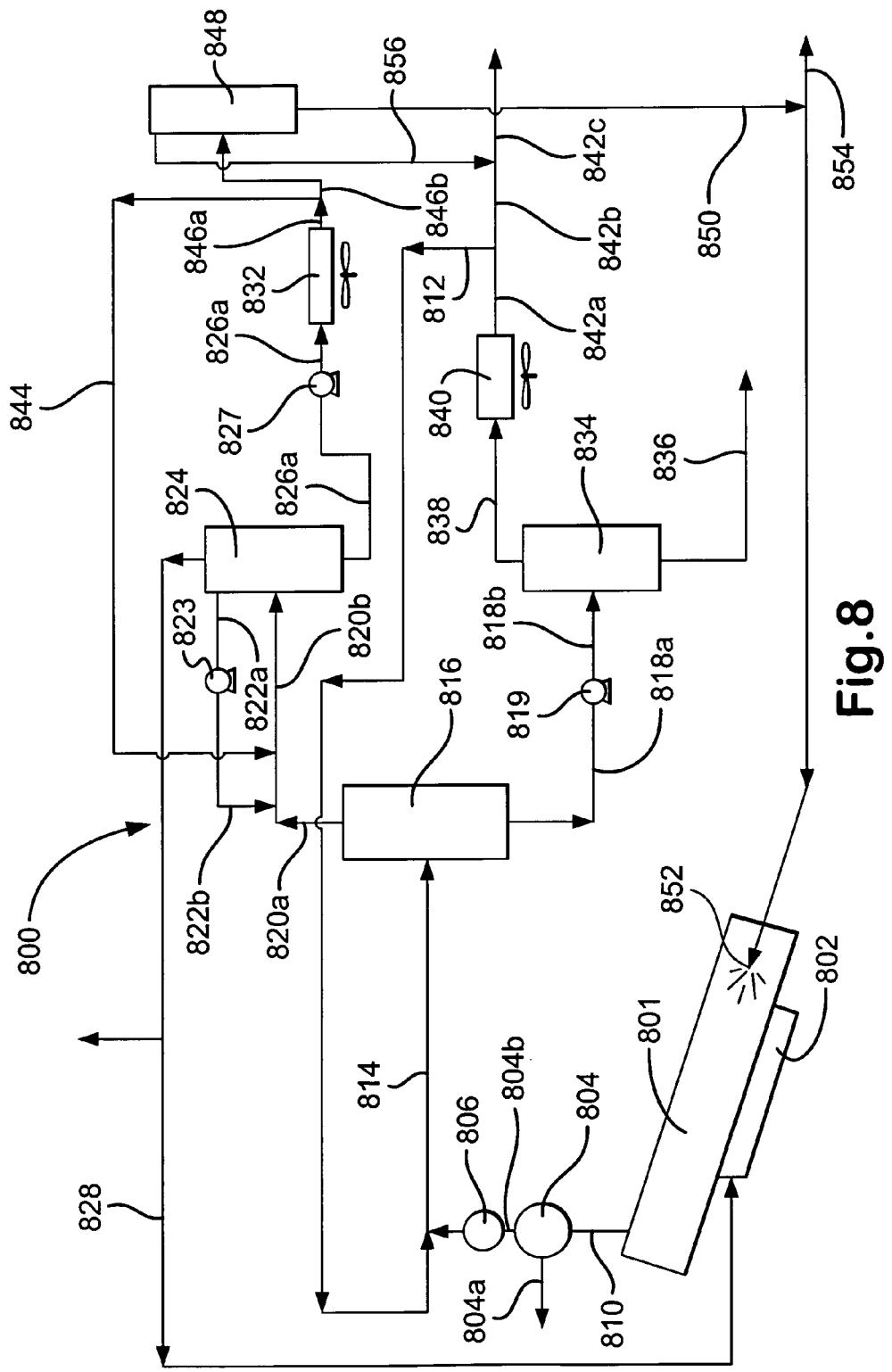
FIG. 8 is a schematic view of a system according to the present invention.

FIG. 8 illustrates a system 800 similar to that of U.S. Pat. No. 6,120,650 (incorporated fully herein for all purposes); but, according to the present invention, a dual component separator is used to treat vapor/gas with solids therein exiting from a dryer or kiln. In certain aspects the system 800 has apparatus for separating vaporous mixtures of hydrocarbons, water and emulsifier, if present, derived from the remediation of wellbore fluid, such as a mud containing solid particulate material in which the vaporous mixture is quenched, optionally with a quench system according to the present invention, or with a quench system as in U.S. Pat. No. 6,120,650 which uses a hydrocarbon stream which is at a temperature above the boiling point of water and below the boiling point of the hydrocarbons in the vaporous stream. Preferably, most of the hydrocarbons in the vaporous stream and substantially all of the emulsifier, if present, are condensed into the hydrocarbon quench to form an oil stream. The water may be recovered from the hydrocarbon quench as a vaporous stream and may be quenched with water. The quenched water and any residual heavier hydrocarbons may be separated by phase separation. In the system 800 a line 810 carries kiln vapors comprising hydrocarbons, water, emulsifier and other volatile constituents a kiln 801 to a dual component separator 804. Optionally, the vapor/gas output of the separator 804 is fed to a quench system 806 according to the present invention, e.g., like the system of FIG. 3. Separated solids flow from the separator 804 in a line 804*a* for disposal and/or further treatment (e.g., as solids flow in other systems according to the present invention disclosed herein). The vapor/gas output of the separator 804 flows in a line 804*b* to a line 814 (optionally through the quench system 806). The line 814, optionally, has cool oil quench sprayed into it from a line 812 carrying cool oil to cool the vapor/gas stream and condense hydrocarbons therein, preferably a substantial part of them or preferably substantially all of them. The condensed vapors are collected in a primary separator 816 where the liquid hydrocarbon is separated via line 818*a* from water vapor and light hydrocarbons, such as methane and non-condensibles such as carbon monoxide and carbon dioxide which exit the separator via a line 820*a*. In this first separation, preferably not only are most of the hydrocarbons and water separated but if surfactants and emulsifiers were added to the wellbore fluid they also are stripped into the liquid hydrocarbon fraction. Thus, the small amount of hydrocarbons remaining in the vaporous water phase is easily separated by phase separation since there is substantially none of the surfactant or emulsifier carried out in the vapor phase from primary separator 816. Optionally, the hydrocarbon (oil phase) recovered via line 818*a* is sent to a filter 834 through a pump 819 and a line 818*b*. The filter may be, for example, an oil cyclone where dirty oil blowdown is collected via line 836 and recycled to the auger feed (not shown) to kiln 801 or otherwise disposed of. The clean oil recovered via a line 838 is cooled by an a heat exchanger 840, which is one aspect is an air cooled heat exchanger exiting through a line 842*a*. A portion may be sent to storage via a line 842*b* and a portion sent through the line 812 to quench the contents of line 814. Cool water is sprayed from a line 822*b* into a transfer line 820 to, preferably, condense out most of the water and some higher hydrocarbons, which is collected by a secondary separator 824 where the condensed water and some hydrocarbons are recovered via a line 826*a*. Non-condensibles, if present and depending on the composition and the relevant environmental considerations, are recovered via a line 828 and may be used as auxiliary fuel for kiln burners 802. The condensed material (mainly water) leaves the secondary separator 824 via a line 826*a* and is pumped by a pump 827 through a line 826*b* to a heat exchanger 832 and then into a line 846*a*. A portion of the material in the line 846*a* is returned via a line 844 to the transfer line 820*a* to aid in cooling the vaporous feed from the primary separator 816. Also in this embodiment cooled material from the secondary separator 824 via a line 822*a*, a pump 823 and a line 822*b* is used to cool the incoming vapors in a line 820*a*.

A portion of cooled condensed material from the heat exchanger 832 is also, preferably, sent to an oil/water phase separator 848 via a line 846*a* where water is recovered from the bottom of the separator 848 via a line 850 and may be used as dust suppressor spray 52 in the kiln 801 or on kiln product (not shown) or recovered for disposal via a line 854.

The hydrocarbon phase from the separator 848 is recovered and sent to storage via a line 856 and a line 842*c*. In FIG. 8, which is schematic, many of the pumps, valves, pressure regulators and other items of conventional equipment are omitted, however their use and placement are readily apparent to those of ordinary skill.

FIG. 9 illustrates a system 900 according to the present invention which is like the systems of U.S. Pat. No. 5,570,749 (incorporated fully herein for all purposes), but which uses a dual component separator. The system 900 has apparatus for removing and treating hydrocarbon-contaminated drill cuttings suspended in drilling mud so that the cuttings are made environmentally acceptable while the hydrocarbon contaminants are contemporaneously captured and returned for use in the drilling mud. Using one or more shakers to make a first separation of the cuttings from the mud, a mud stream and a first slurry containing cuttings are produced. The mud stream is fed into a mud pit, while the first slurry is fed to a classifier/grit dewatering unit to separate the cuttings from the slurry to obtain a drill solids discharge. The drill solids discharge is passed into a rotating, heat-jacketed trundle for a time and at a temperature sufficient to vaporize the hydrocarbon contaminants to obtain processed solids and hydrocarbon vapors. The hydrocarbon vapors are fed to a dual component separator for dust removal and then condensed to obtain a liquid hydrocarbon, which is delivered to the mud pit for admixture with the mud stream.

In the system 900 a mixture of drilling mud and drill cuttings are carried to the system in any know way, e.g. by a mud return pipe 910. At a valve junction 912 the mixture may be routed to either a gas buster 914 or a scalping shaker 916, or to both. If the mixture is routed through the gas buster 914, it is discharged into the scalping shaker 916. The scalping shaker 916 is aligned in series with a linear motion shaker 918. The function of the scalping shaker 916 and the linear motion shaker 918 are to perform a first separation of the drill cuttings from the mud to obtain a mud stream and a first slurry containing the cuttings.

The mud stream produced by the tandem of the scalping shaker 916 and the linear motion shaker 918 is fed into a mud cleaning pit 920. The mud cleaning pit 920, preferably, has a plurality of bins divided by mud return equalizers 922*a-f* and partial walls 924*a-f*. The mud return equalizers 922*a-f* are each provided with a gate located at their end adjacent to the bottom of the mud cleaning pit 920. The equalizers 922*a-f* are designed to back-flow for proper mud cleaning. The top of equalizers 922a-f are located approximately four inches below the mud cleaning level. The mud return equalizers 922a-f and the partial walls 924a-f provide for the progressive movement of the mud stream through the mud cleaning pit 920 to a working mud area 926. Several supporting components may be adapted to the mud cleaning pit 920. Preferably, the mud cleaning pit 920 is provided with a degasser 928, which circulates a slipstream of mud taken from the first bin of the mud cleaning pit 920. A degasser pump 930 is adapted to connect to the degasser 928 to provide the required circulation.

The mud cleaning pit 920 may also be provided with a desander 932, a desilter 934 and/or a mud cleaner 936. Each of these devices is provided with a corresponding pump, respectively, a desander pump 938, a desilter pump 940 and a mud cleaner pump 942. The desander 932, desilter 934, and mud cleaner 936 are arranged such that each accepts a slipstream of mud from the mud cleaning pit 920 and produces two outflow streams. Both desander 932 and desilter 934 output a light liquid stream (or "light" slurry) back into the mud cleaning pit 920. The second outflow from the desander 932 and desilter 934 is of a slurry that contains solids (a "heavy" slurry). The heavy slurry outflow from the desander 932 and defilter 934, along with the outflow from the mud cleaner 936, are processed as further described below.

An optional classifier/grit dewatering unit, generally indicated by the reference numeral 944 is designed to separate liquids from solids by sedimentation. The dewatering unit 944 is compartmented, as it includes an effluent tank 946 for use as a holding buffer separated by a baffle 948 from a forward-facing, inclined sedimentation portion 950. The sedimentation portion 950 of the classifier/grit dewatering unit 944 is provided with a variable speed inclined driving screw feeder 952 (or discharge auger) to move sedimented solids from the classifier grit dewatering unit 944 to a conveyor belt/stacker 954. The first slurry containing drill cuttings discharged from the shakers 916, 918 and the cutting containing slurry discharged from mud cleaner 936 are fed into the sedimentation portion 950 of the dewatering unit 944. There, sedimentation works to separate the hydrocarbon containing solids, or drill cuttings, from the lighter, more liquid drilling mud components. The heavy slurry from the desander 932 and desilter 934, along with a "light" stream from mud cleaner 936, are discharged into the effluent tank 946.

If weighted mud is being used another slipstream can be taken from the mud cleaning pit 920 and routed through a first centrifuge feed pump 956 to a first centrifuge 958, where two outflow streams are generated. The lighter of the two outflow streams is discharged into the effluent tank 946, while the heavier of the two streams is discharged into the sedimentation portion 950 of the dewatering unit 944. A second centrifuge pump 960 is connected to the lower portion of the effluent tank 946 to move sedimented matter to a second centrifuge 962 for barite removal and dewatering. The second centrifuge 962 produces two outflow streams, the lighter of which is routed to mud cleaning pit 920 and the heavier of which is routed to the sedimentation portion 950 of the dewatering unit 944.

The discharge auger 952 generates a drill solids discharge from the sedimentation portion 950 of the dewatering unit 944. The sedimented drill solids discharge is moved by the conveyor belt/stacker 954 to a rotating, dryer or heat-jacketed trundle 964. The trundle 964 can vary in size, a small trundle measuring approximately 4×32 feet and being capable of processing 50 tons of drill solids discharge per day, and a large trundle measuring approximately 8×36 feet and being capable of processing up to 200 tons of drill solids discharge per day. The trundle 964 uses indirect thermal desorption for hydrocarbon reclamation. Any suitable known dryer may be used for the trundle 964. In one aspect, external heat at approximately 900 degrees to 1400 degrees F. (2 million BTU/hour) is delivered to a heat jacket which transfers heat in amounts sufficient to elevate the internal cuttings or soil temperature to 300 degrees F. to 900 degrees F. Exit temperatures are, preferably, held between 3000 degrees F. and 500 degrees F. Soil transit time is regulated by rotation, inclination and/or feed rate and averages 20 to 40 minutes.

After the drill solids discharge has been in residency in the trundle 964 for a time and at a temperature sufficient to vaporize the hydrocarbon contaminates, there is recovered processed solids, indicated by the reference numeral 966, and hydrocarbon vapors which may have dust therein. The processed solids 966 are in a remediated condition such that disposal is environmentally acceptable.

The hydrocarbon vapors with dust therein generated by the trundle 964 are captured and moved through a dual component separator 968. From the separator 968, the hydrocarbon vapors are, optionally, fed to a quench system 969 (any disclosed or referred to herein) and then to condenser unit(s) 970. Solids (e.g., fines and dust) removed by the separator 968 flow out in a line 968a for disposal or for further treatment, e.g., as in other systems according to the present invention disclosed herein. The condenser(s) 970 condense the hydrocarbon vapors to obtain a liquid hydrocarbon which is routed to an oil reclamation tank 972. An exhaust fan 974 and exhaust stack 976 are connected to the condenser unit 970 for managing the exhaust from condenser unit 970. The liquid hydrocarbon condensed in the condenser unit 970 may be delivered back to the mud cleaning pit 920 from oil reclamation tank 972 via pump 978.

It is within the scope of the present invention: to use any known quench system for quenching vapor from a dryer and/or from a separator, and to use any cooling liquid for such quenching, although a quench using a hydrocarbon quench is not the legal equivalent of the water quench systems disclosed herein according to the present invention; and to use any suitable known separator instead of the dual component separators disclosed herein, although such other separators are not the legal equivalent of the dual component separators disclosed herein.

Figure 10A:
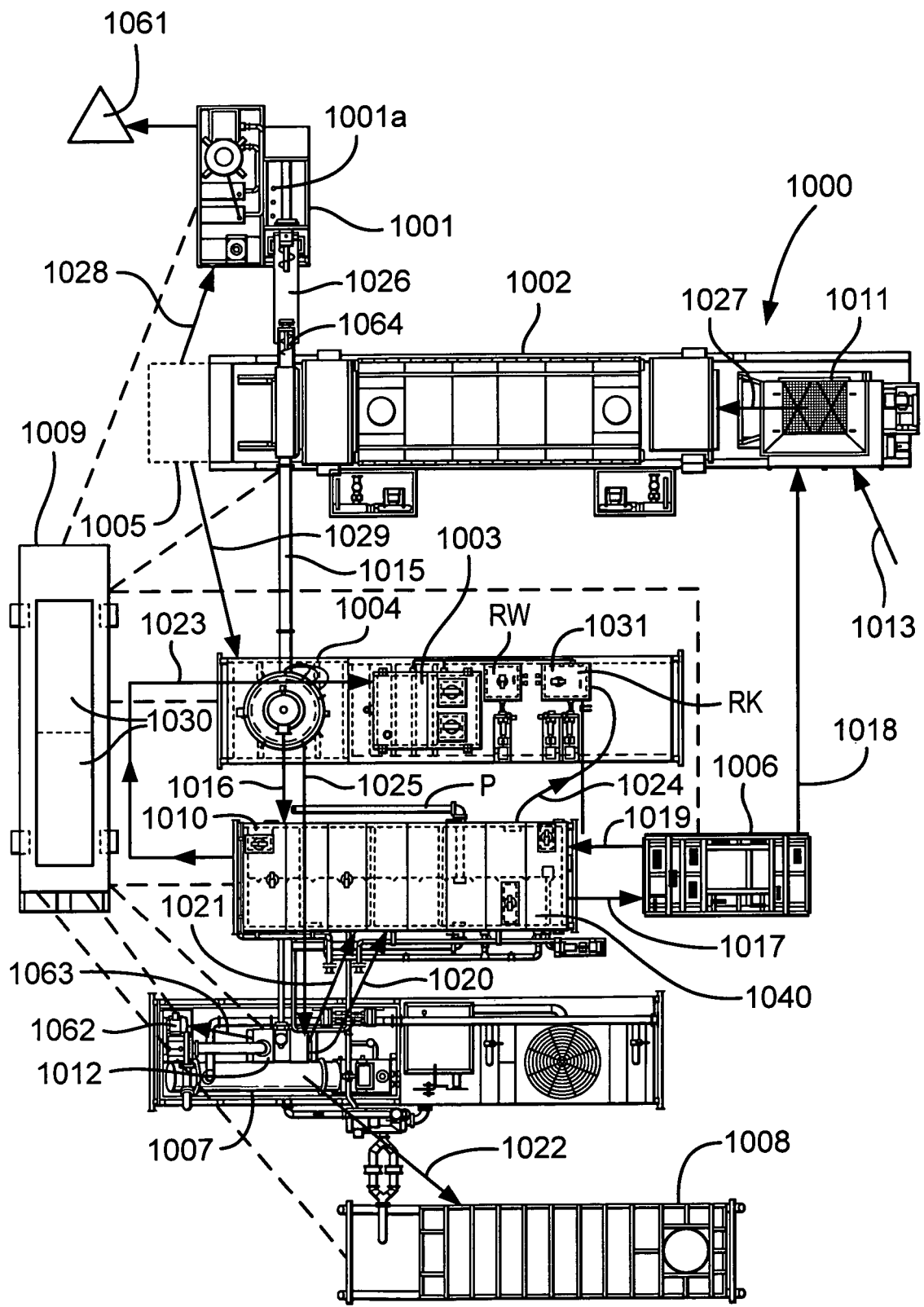
FIG. 10A is a top schematic view of a system according to the present invention.
Figure 10B:
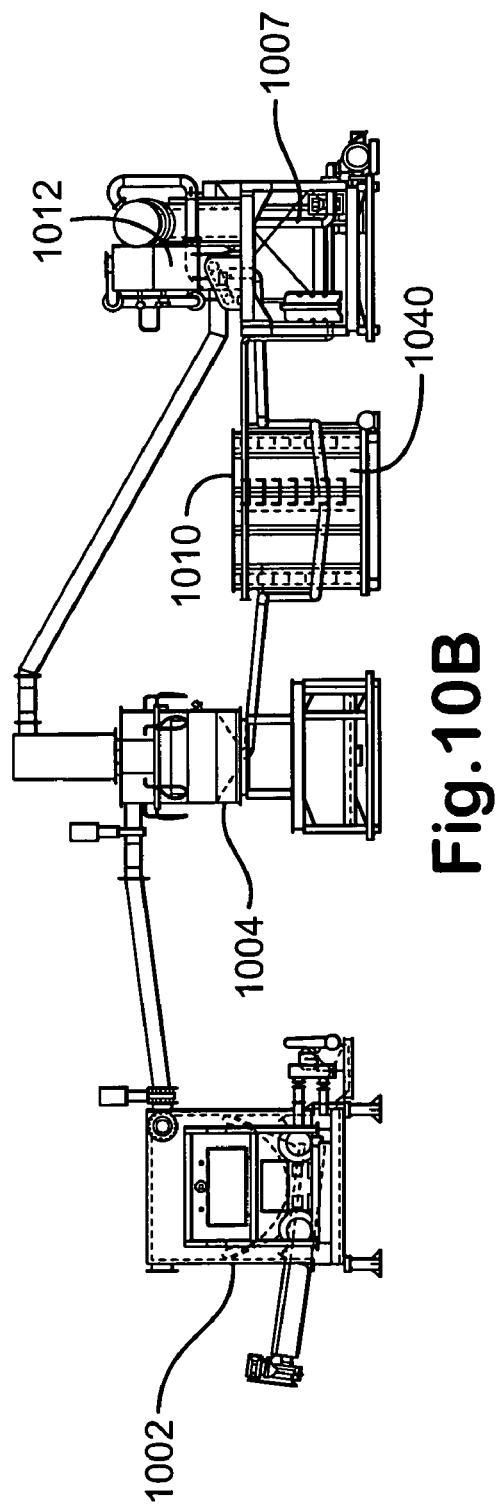
FIG. 10B is a side schematic view of a part of the system of FIG. 10A.

FIGS. 10A and 10B show a system 1000 according to the present invention which has a mill 1001; a dryer 1002; an oil/water separator 1003; a quench system 1004; optionally, a baghouse system 1005; a condenser system 1007; a thermal oxidizer system 1008; a scrubber system 1012; and a control room 1009. Dotted lines from the control room 1009 indicate communication between one, two, or more control systems 1030 and each component of the system 1000. The control room 1009 contains appropriate control apparatuses and devices for controlling and selectively activating and deactivating each component, apparatus, and device of the system 1000; including, but not limited to, switches, starters, overload protectors, alarms, monitors, and variable frequency drives.

An input stream 1013 of material, e.g. contaminated soil, material contaminated with chemicals and/or hydrocarbons, or drilling materials (e.g. drilling fluid, debris, and/or drilled cuttings) is introduced to a feed system 1011, e.g., but not limited to, a "grizzly" vibrating grid system for removing large pieces (e.g. over 2", over 3", or over 4" in largest dimension) of material and an auger or other transport apparatus for conveying material from the feed system 1011 to the dryer 1002. The feed system 1011 produces a material stream 1027. A stream 1026 of material from the dryer 1002 (e.g. 12,100 lbs/hr at 675° F.) is fed to the mill 1001 (e.g. a pugmill) which mills and, if needed, rehydrates the milled material and discharges if, e.g. to a pit 1061. Rehydration can be accomplished using a spray system 1001*a* (e.g. spraying about 6 GPM) in the mill 1001. The stream 1027 (e.g. a stream of drilling material from which pieces over 4" have been removed) is fed to the dryer 1002 (e.g. any dryer or thermal treatment system disclosed herein). A stream of material from the dryer 1002 is fed directly to a quench system or, optionally, to a baghouse system 1005 which produces a stream 1028 with particles that is fed to the mill system 1001 and a vapor stream 1029 from which the baghouse system has removed particles (e.g. fine particles). Alternatively, the stream 1029 flows from the dryer 1002 (e.g. at about 800° F.) without going through a baghouse system directly to the quench system 1004 (and such a stream 1029 has entrained within it particles which could have been removed by a baghouse system). Solids from the dryer 1002 are augered with an auger system 1064 (which may include multiple augers 1064) in the stream 1026 to the mill system 1001.

The quench system 1004 produces a stream 1025 which is fed to the scrubber system 1012. Water, e.g. at about 50 GPM is sprayed with sprays 1012*a* supplied by a line 1012*b*. A fan 1062 (or other air mover system) produces a suction pressure which moves the stream 1025 to the scrubber system 1012. The fan 1062 also assists in moving the stream 1029 and the pressure of vaporized liquids in the dryer 1002 pushes material in the stream 1029. The stream 1025 (containing vapor and some fine particles) is treated in the scrubber system 1012 producing a stream 1063 that proceeds through the fan 1062 to the condenser system 1007 and produces a liquid/solids stream 1020 that flows by gravity to a dirty side of the weir tank system as described in more detail below and a dirty stream 1016 which flows to the dirty side 1046 of a weir tank system 1010. The quench system 1004 communicates with the oil/water separator 1003 which works in fluid communication with the recovered oil tank 1031.

The weir tank system 1010 produces output streams streams 1023, 1024, and 1017. The stream 1024 from the clean side 1047 of the weir tank 1040 (e.g. in one aspect about 2.8 GPM at 130° F.) is relatively clean fluid (e.g. reusable oil) which can be re-used or returned to a customer. The stream 1023 is a relatively clean liquid stream (e.g. an oil/water stream; e.g. 99% water, 1% oil) which is fed to the oil/water separator 1003 for processing thereby. An internal stream 1109 (primarily water) flows from the dirty side 1046 to the clean side 1047. The stream 1017 is sucked by the centrifuge system 1006 (e.g. in one aspect at about 150 GPM) after flowing off of the top from the dirty side 1046 of a weir tank 1040 (see description below) for processing by the centrifuge system 1006. The centrifuge system 1006 (which may have any suitable known centrifuge or centrifuges, e.g., but not limited to, Model 3400 commercially available from Brandt/Varco) produces the stream 1018 (e.g. at about 0.1 GPM) which is primarily solids which is fed to the system 1011; and a liquid stream 1019 (primarily oil with some water) which is fed back into a "clean" side 1047 of the weir tank 1040.

The condenser 1007 also feeds the primarily liquid stream 1021 to the dirty side 1046 of the weir tank 1040 and the scrubber system 1012 also feeds a primarily liquid stream 1020 to the dirty side 1046 of the weir tank 1040. The scrubber system 1012 is optional.

Figure 12:
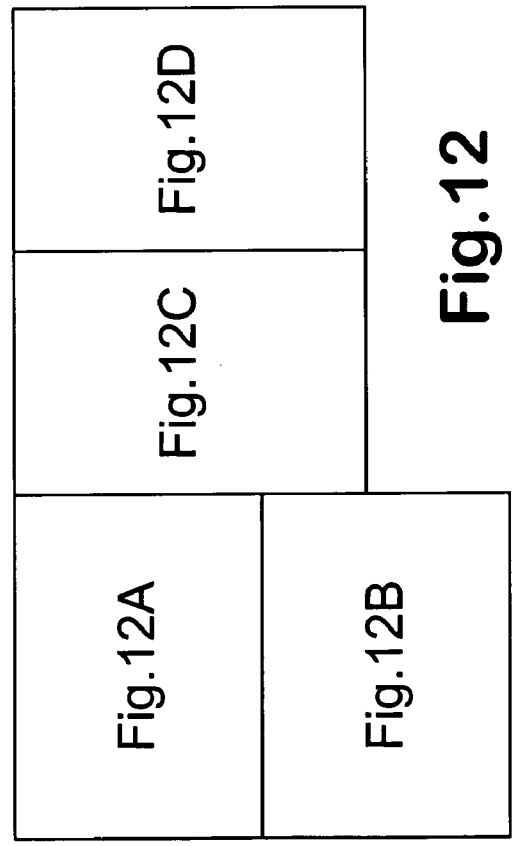
FIGS. 12A and 12B present schematic views of a system according to the present invention.
Figure 12A:
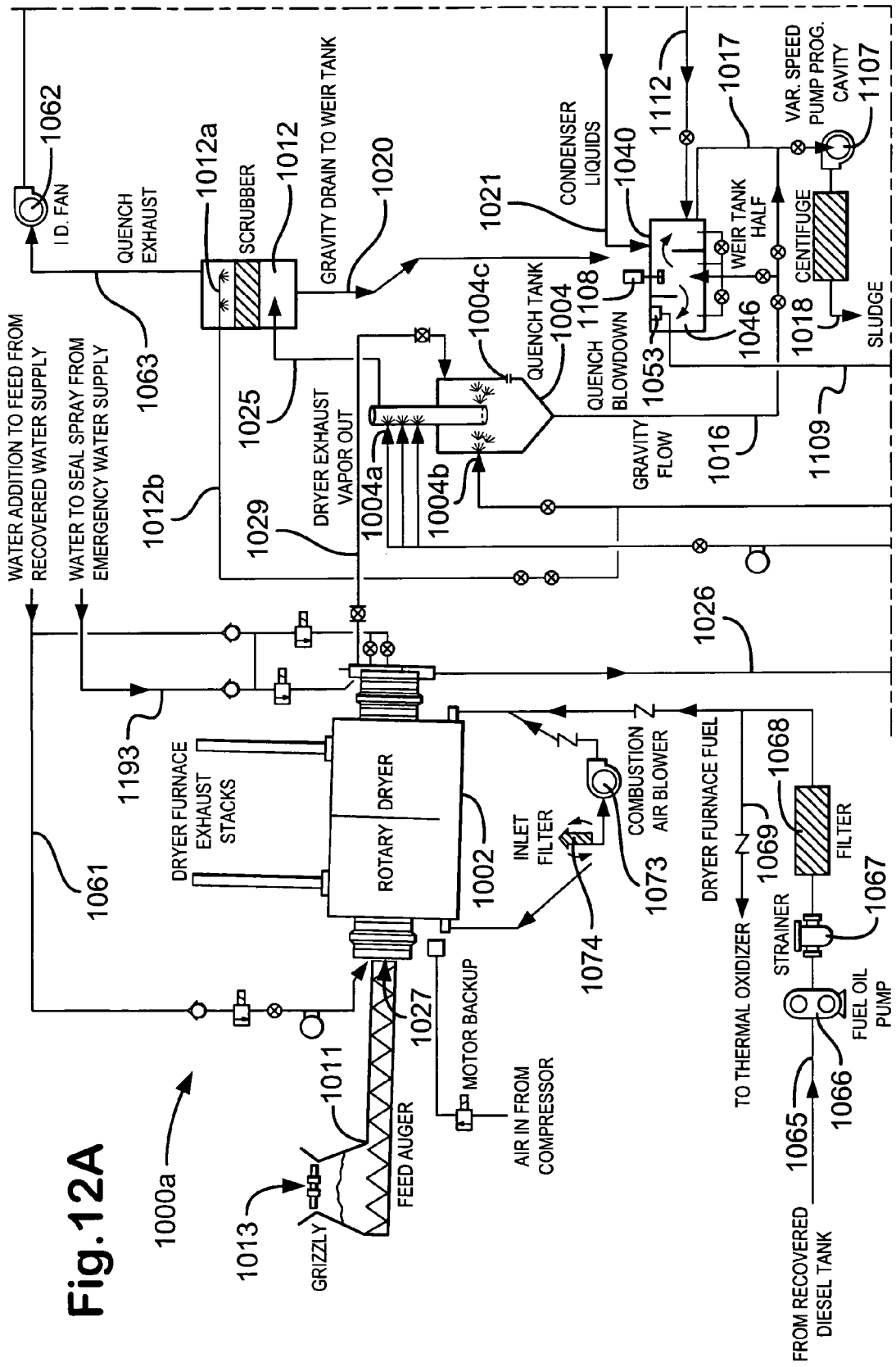
Figure 12C:
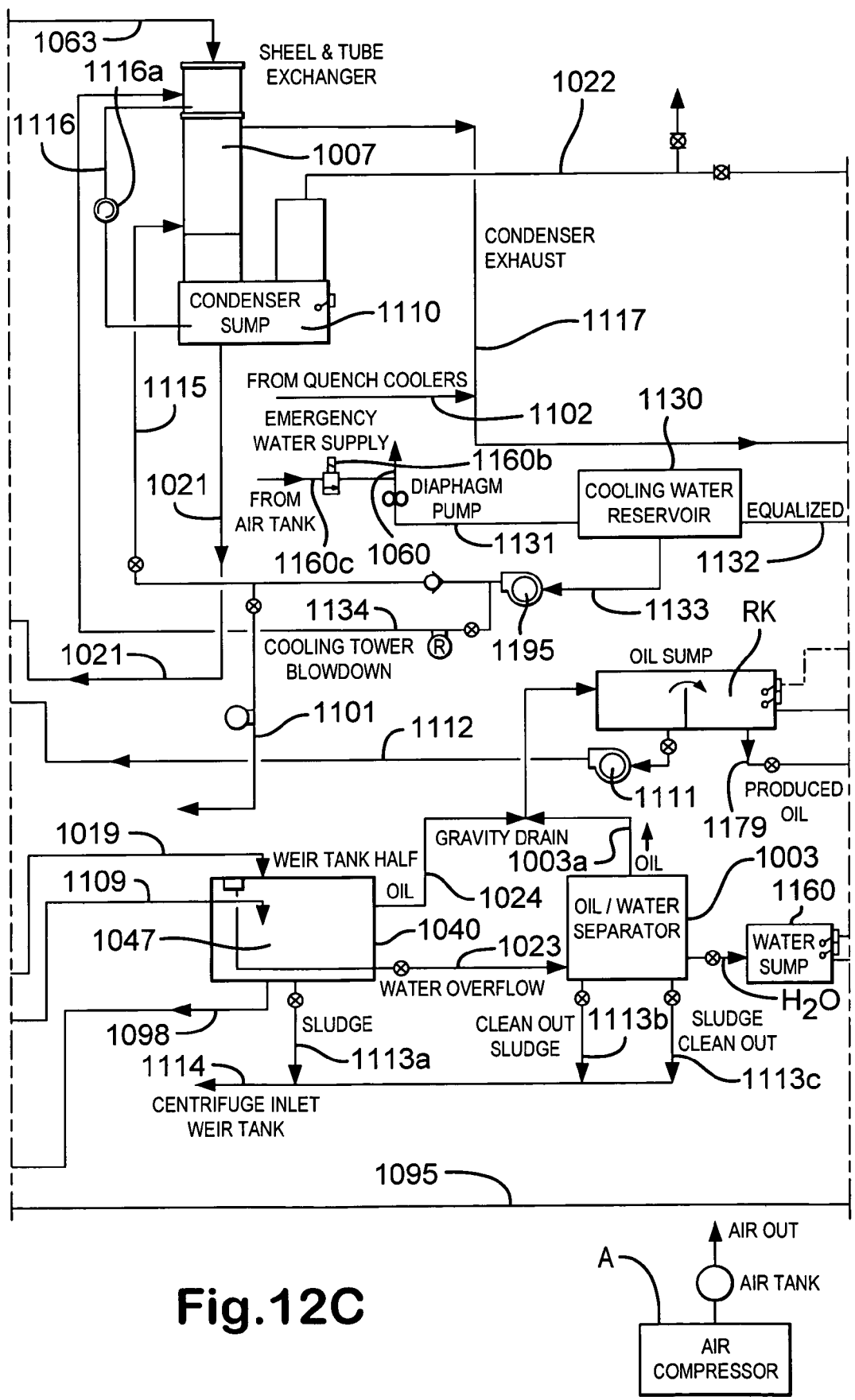
Figure 12D:
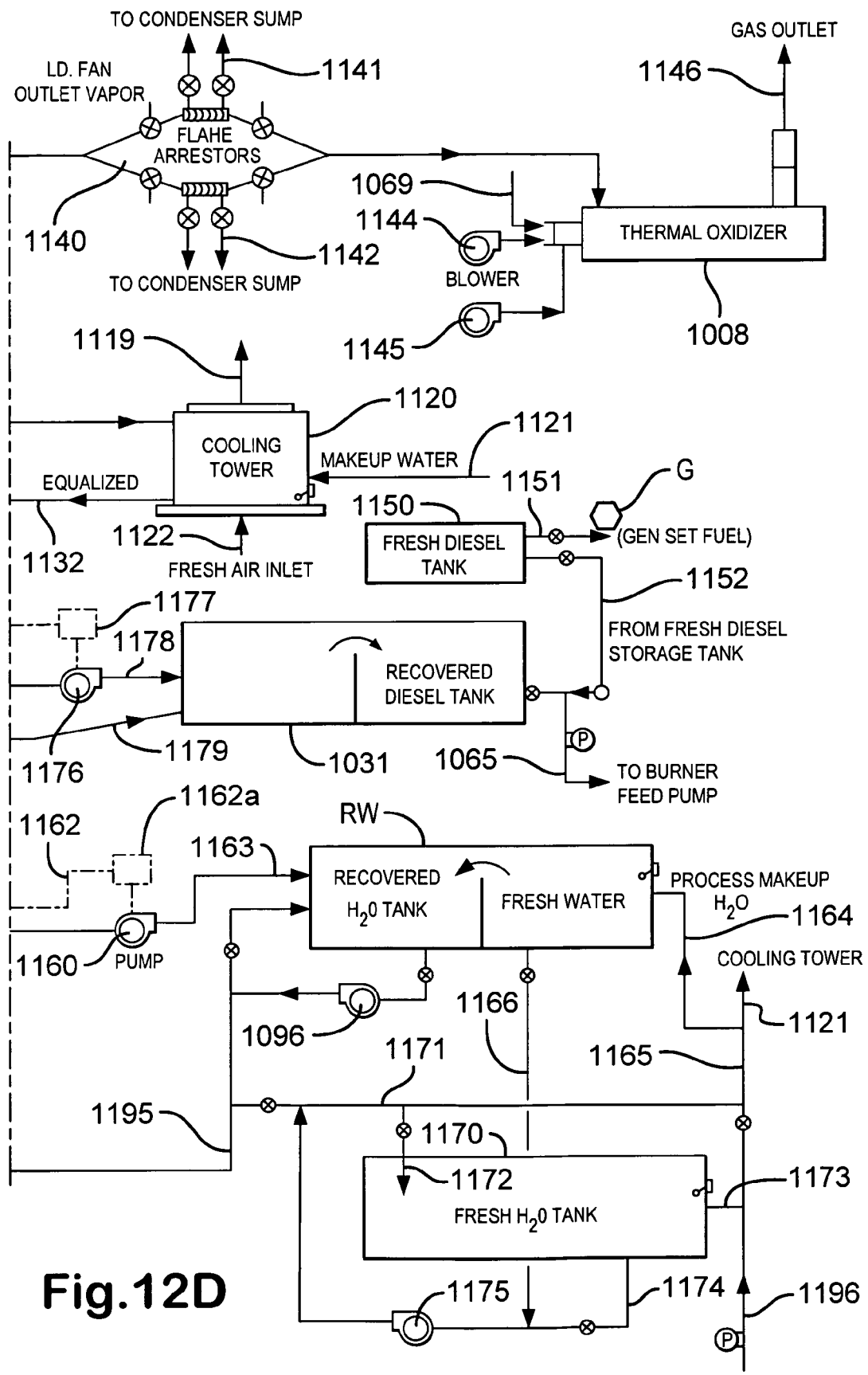

The quench system 1004 sprays water, e.g., in one aspect 300 gal/min., to knock solids out of the streams input into the quench system 1004, i.e. into the material from the stream 1029 (e.g. through sprays 1004*a*, 1004*b*, see FIG. 12A). The oil/water separator 1003 receives the stream 1023 from the weir tank system 1040 which is a liquid stream, e.g. a stream with water and oil, and/or water and hydrocarbons. Recovered oil flows in a line 1003*a* (e.g. at about 0.1 GPM, at 130° F.) from the oil/water separator 1003 to the tank RK. The quench system 1004 produces a stream 1016 (with liquids and solids in it; e.g. in one aspect at about 300 GPM) which is fed (via gravity flow) in a pipe P to a dirty side 1046 of the weir tank system 1010 (or, alternately, in line 1017).

The condenser 1007 produces a vapor stream 1022 which is fed to the thermal oxidizer system 1008. In one aspect when treating drilling material, the stream 1022 contains chemicals that are relatively difficult to condense, e.g., light end hydrocarbons (e.g. benzene) which can be burned in the thermal oxidizer (which can vent to atmosphere).

Figure 11A:
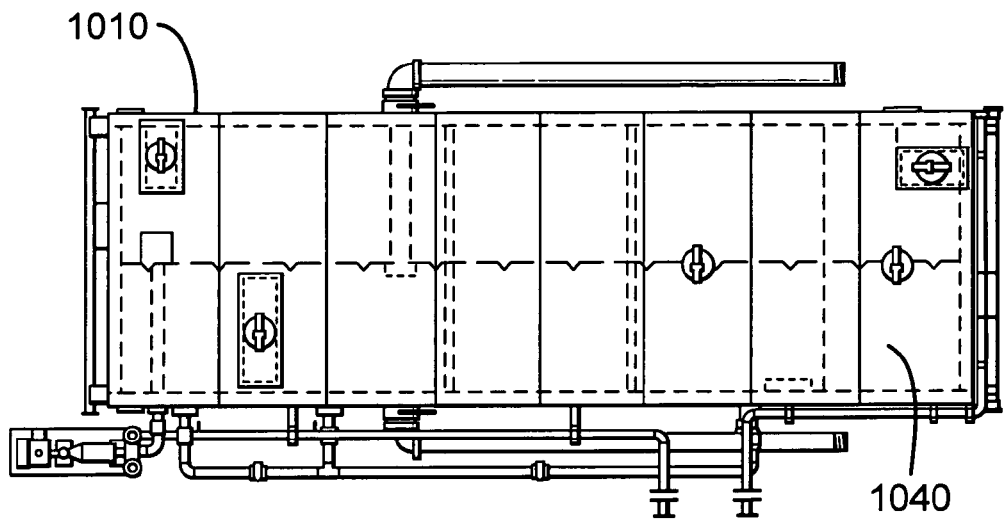
FIG. 11A is a front view of a weir tank for the system of FIG. 10A.
Figure 11B:
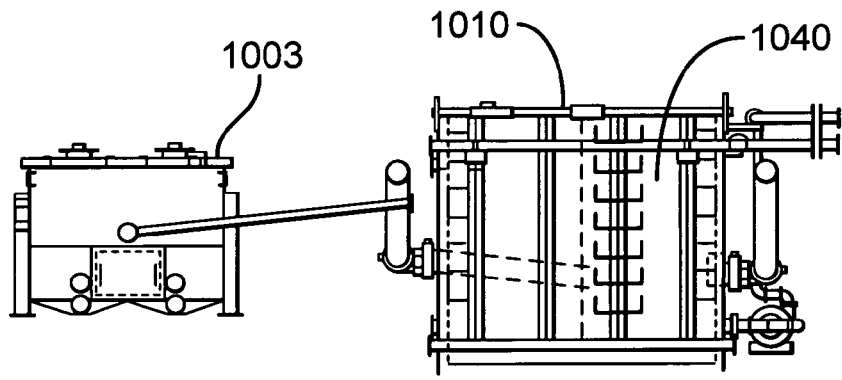
FIG. 11B is an end view.
Figure 11C:
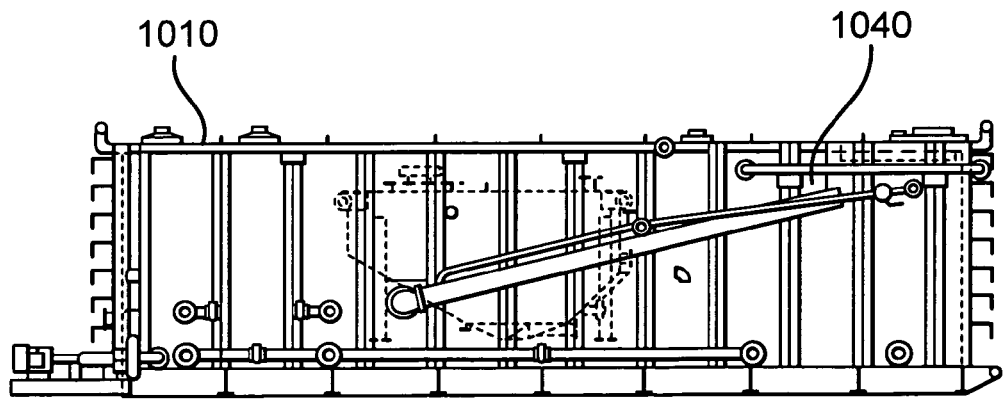
FIG. 11C is a rear view of the tank of FIG. 11A.
Figure 11D:
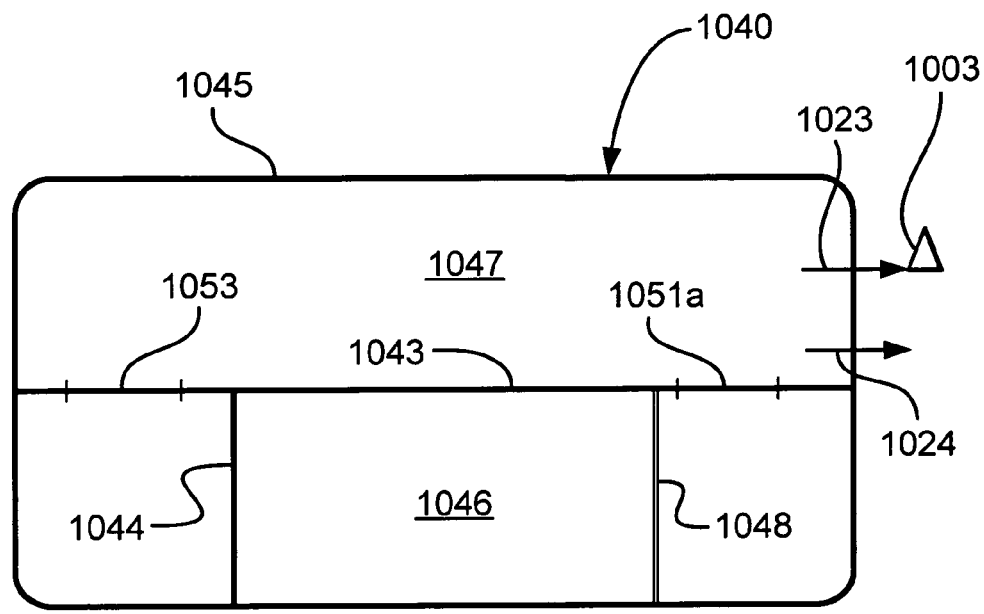
FIG. 11D is a top schematic view of the tank of FIG. 11A.
Figure 11E:
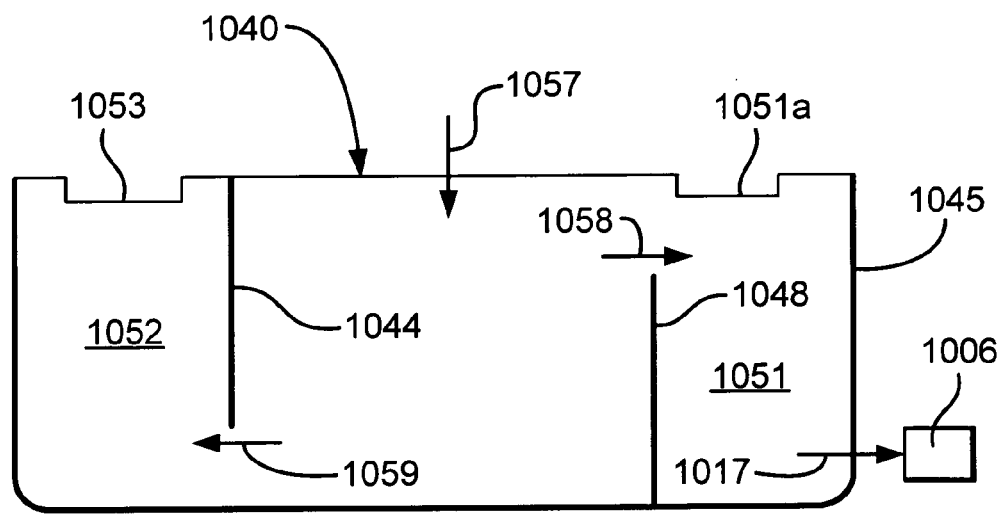
FIG. 11E is a side cross-section schematic view of the tank of FIG. 11A

FIGS. 11D and 11E illustrate one embodiment of a weir tank 1040 for the weir tank system 1010. An enclosure 1045 (four outer walls and a floor) is divided by a wall 1043 into a dirty side 1046 and a clean side 1047. The dirty side 1046 has an "under" weir 1044 and an "over" weir 1048. Material 1057 (e.g. streams 1016, 1020, 1021) is input between the under weir 1044 and the over weir 1048. Oil and oil-laden solids 1058 rise to the top of the liquid between the under weir 1044 and the over weir 1048. This oil, etc. flows over the over weir 1048 into a compartment 1051 from which the centrifuge system 1006 the material (e.g. in a stream 1017 which contains solids and liquid). Oil flows over an oil over weir 1051*a* into the clean side 1047. The weir tank 1040 may, optionally, have a removable lid.

Liquid 1059, e.g. water, and/or some oil, flows under the under weir 1044 into a compartment 1052. This fluid then flows through an upper weir 1053 (stream 1109) into the clean side 1047 of the enclosure 1045. A stream 1024 (e.g. a stream of oil or diesel off the top of material in the clean side 1047) flows from the clean side 1047 to a tank RK and/or tank 1031 for re-use. Water recovered by the oil/water separator 1003 is fed to a recovered water tank RW for re-use and/or discharge.

FIGS. 12A and 12B present a variation 1000*a* of the system 1000 (FIG. 10A) and like numerals indicate like parts. In one particular aspect 8 metric tons per hour of material, e.g. drilling material with drilling fluid to be recovered and drilled cuttings to be separated and discharged, flows in the line 1013 to the system 1011.

As needed, water from the tank RW is supplied in a line 1061 to the dryer 1002. As needed, water from an emergency water supply 1060 is provided in a line 1193 to a spray for an outlet seal of the dryer 1002.

Combustion air for the dryer 1002 is provided by a blower system 1063 with a filter 1064. Fuel for the dryer 1002 from the recovered fuel tank 1031 flows in a line 1065, pumped by a pump 1066, through a strainer 1067 and a filter 1068, to the dryer 1002, e.g. at about 4 GPM. Fuel for the thermal oxidizer flows in a line 1069. A valve 1070 (e.g. an air-operated commercially-available double tipping air lock valve) controlled by a solenoid operated valve 1071 controls flow in the line 1026 and inhibits the passage of air back into the system while permitting the flow of solids.

Material (e.g. steam with contaminants) in a line 1081 from the mill 1001 flows to a scrubber 1080 which "knocks down" (condenses) the steam producing a stream 1082 which is predominantly water which flows (e.g. at about 50 GPM) to a side 1084 of a tank 1083 which is divided by a wall 1089. Solids ("SLUDGE") flow from the tank['s side 1084 in a line 1086 and water flows from a tank side 1085 in a line 1087 (e.g. at about 50 GPM), pumped by a pump 1088 back to the scrubber 1080 for additional cleaning. As needed, additional water (e.g. at about 4.3 GPM) is provided to the tank side 1085 in the line 1091 (pumped by a pump 1096). The scrubber 1080 can reduce the amount of dust produced by the mill 1001 and inhibit its release to the atmosphere.

A mill discharge auger 1092 conveys discharged material 1093, e.g., drilled cuttings at about 150° F., from the mill 1001. The lines 1092, 1062 and a line 1094 supplying the sprays 1001a receive water from a line 1095 into which water is pumped from tank RW by a pump 1096. As needed, e.g. for washing system components or to fight fires, water is provided in a line 1097. Cooled water for the quench system 1004 is provided in a line 1103 (e.g. 300 GPM at 120° F.) to the sprays 1004a and 1004b. In one aspect there are three sprays 1004a (total spray about 60 GPM) and six sprays 1004b in a ring around the quench vessel 1004c (total spray about 240 GPM). Two sets of sprays provide redundancy in the event one set or part thereof clogs or ceases operation. A pump 1106 pumps water for the line 1103 from the clean side 1047 of the weir tank 1040 through heat exchangers 1104 and 1105. Circulating water from the cooling tower 1120 is provided to these heat exchangers via lines 1101, 1102.

A pump 1107 pumps fluid in the line 1017 from the dirty side 1046 of the weir tank 1040 to the centrifuge system 1006. A pump 1108 (e.g. an induced air pump) puts small bubbles into the material in the weir tank 1040 to promote oil flotation. Water in the line 1109 may have some oil in it.

Optionally, to treat condensed oil and/or heavy oil from the oil sump RK, a pump 1111 pumps the material in a line 1112 (e.g. at 1-2 GPM) to the dirty side of the weir tank 1040 for flow from there to the centrifuge system 1006. Fluid with particles in it from lines 1113a-1113c flows in a line 1114 to the dirty side 1046 of the weir tank 1040 for flow to the centrifuge system 1006.

A pump 1195 pumps cooled water from the cooling reservoir 1130 in a line 1113 (e.g. at about 660 GPM and 85° F.) to a line 1134 near the top of the condenser system 1007 and in a line 1115 to a point lower down in the condenser system 1107. Line 1116 has a pressure gauge 1116a to measure the differential pressure between two points on the condenser system 1007 to provide an indication of plugging of the condenser system 1007 if it occurs. Material from the condenser sump 1110 at the bottom of the condenser system 1007 flows in the line 1021, e.g. by gravity, to the dirty side 1046 of the weir tank 1040. Fluid primarily water, flows in a line 1117 (e.g. 660 GPM at 95° F.) to the cooling tower 1120.

Water vapor exhausts from the cooling tower 1120 in a line 1119. Makeup water is provided to the cooling tower 1120 in a line 1121, e.g. from the tank 1170. Fresh air from atmosphere enters the cooling tower 1120 in a line 1122. Cooled water flows, e.g. at about 660 GPM and at about 83° F., in a line 1132 from the cooling tower 1120 to the reservoir 1130. Water for the emergency water supply 1160 is provided in a line 1131. The emergency water supply has a pump 1160a; and a valve 1160b which controls air in an air inlet line 1160c from an air compressor system A. In one aspect the bulk of water sprayed into the condenser system 1007 is conveyed through the line 1115.

The stream 1022 (with uncondensed gases therein e.g. air, nitrogen, ethane, and/or methane; e.g. at 99° F.) from the condenser system 1007 flows through a flame arrestor system 1140. Condensate from the flame arrestor system 1140 flows in lines 1141, 1142 to the condenser sump 1110. Blowers 1144 and 1145 provide combustion air and makeup air for the thermal oxidizer 1008. Products of combustion (e.g. carbon dioxide, oxygen, and/or gases) are exhausted through an outlet 1146.

A tank system 1150 provides fresh diesel fuel to the system 1000a, in a line 1152 to the recovered diesel tank 1031 and in a line 1151 to a generator system G which produces electricity for the system 1000a. Line 1065 provides fuel to the dryer 1002.

Water from the oil/water separator system 1003 is collected in a sump 1160 and pumped from it by a pump 1161 in a line 1163 to the tank RW. A float switch 1162a in a line 1162 selectively turns the pump 1161 on and off to prevent overflow of the sump 1160. Fresh water is input into the tank 1170 in lines 1196, 1173 and is provided in lines 1165, 1121 to the cooling tower 1120 and in lines 1165, 1164 to the tank RW. A pump 1175 pumps water in a line 1166 from the tank RW and in a line 1174 from the tank 1170 to the line 1095 and, as desired, in lines 1171, 1172 into the tank 1170.

Optionally, produced oil flows by gravity in a line 1079 from the tank RK to the tank 1031.

The present invention, therefore, provides, in at least some embodiments, methods for treating material, the material including a first liquid component and solids, the methods in some aspects, including: introducing material including a first liquid component and solids to a system for remediation, the system including a thermal treatment system, a quench system, a weir tank system and a condensing system; feeding a liquid slurry of the the material to the thermal treatment system and heating the liquid slurry therein producing heated discharge solids and a discharge stream with the first liquid component and solids therein; discharging the heated discharge solids from the thermal treatment system; feeding the discharge stream to a quench system; cooling the discharge stream in the quench system producing a cooled discharge stream; feeding the cooled discharge stream to the weir tank system, the weir tank system having a clean side and a dirty side, the cooled discharge stream fed to the dirty side of the weir tank system; and from the dirty side of the weir tank system producing a stream with solids therein, and from the clean side of the weir tank system producing a cleaned stream of the first liquid component.

The present invention, therefore, provides, in at least some embodiments, methods for remediating drilled cuttings material that includes drilled cuttings, contaminants, solids, oil, and water from a wellbore, the methods, in some aspects, including: introducing the drilled cuttings material to a system for remediation, the system including a thermal treatment system, a quench system, and a weir tank system; feeding a slurry of the drilled cuttings material to the thermal treatment system and heating the slurry therein producing heated cuttings and a produced stream with oil, water and solids therein; discharging the heated cuttings from the thermal treatment system; feeding the produced stream to a quench system to cool said stream producing a cooled stream; feeding the cooled stream to a weir tank system and producing with the weir tank system a first cleaned stream with oil therein and a dirty stream with liquid and solids therein. Such methods may include one or some, in any possible combination, of the following: wherein the weir tank system also produces a second cleaned stream with water and oil therein, the system including production apparatus for producing an oil stream and a water stream, the method further including flowing the second cleaned stream from the weir tank system to the production apparatus, and producing with the production apparatus an oil stream and a water stream; wherein the weir tank system, includes a tank with a wall dividing the tank into a clean side and a dirty side, the tank having a first input compartment, a second compartment, and a third compartment, all said compartments in the dirty side of the tank, the dirty side having an over weir for removing oil from an input stream containing oil, water, and solids by flowing a portion of said input stream from the first input compartment over the over weir into the second compartment and then flowing said oil from the second compartment into the clean side, an under weir for removing water from the input stream, by flowing said water from the first input compartment under the under weir into the third compartment and then flowing said water from the third compartment into the clean side, the method further including recovering oil from the clean side of the weir tank system, and recovering water from the clean side of the weir tank system; flowing a stream with oil, water and solids from the third compartment to centrifuge apparatus for further processing; producing a first centrifuge stream with the centrifuge apparatus, the first centrifuge stream containing solids, and feeding the first centrifuge stream to the thermal treatment system for further processing therein; wherein the system for remediation includes a condenser system and the method further including feeding an uncondensed quenched vapor stream from the quench system to the condenser system, the unquenched vapor stream containing solids, condensing at least part of the unquenched vapor stream producing a condensed stream, and feeding the condensed stream to the dirty side of the weir tank system; wherein the system for remediation includes scrubber apparatus and the method further including prior to feeding the uncondensed quenched vapor stream to the condenser system, feeding the uncondensed quenched vapor stream to scrubber apparatus to remove solids, and then feeding the thus-scrubbed uncondensed quenched vapor to the condenser; wherein a cooling apparatus provides cooling fluid for cooling the condenser to enhance effectiveness of the condenser, the method further including cooling the condenser with cooling fluid from the cooling apparatus; producing uncondensed gases with the condenser, and oxidizing the uncondensed gases; wherein the system for remediation includes a thermal oxidizer and the uncondensed gases are oxidized in the thermal oxidizer; wherein the thermal treatment system has a vessel with an interior wall dividing the vessel into two intercommunicating chambers, the vessel having two spaced-apart ends and a burner at each end for heating drilled cuttings material in each chamber; wherein each burner is in a separate firebox adjacent each chamber; wherein each burner is mounted within the vessel; prior to feeding the slurry to the thermal treatment system, feeding the slurry to a secondary separator system, separating large pieces of material from the slurry with the secondary separator system, and then feeding the slurry with said large pieces removed to the thermal treatment system; wherein the slurry contains by volume a mixture of up to about 25% oil, up to about 25% water, and up to about 50% drilled cuttings; wherein the system for remediation processes at least about 8 tons per hour of slurry; wherein the contaminants in the slurry include hydrocarbon contaminants and the method further includ volatilizing the hydrocarbons contaminants in the thermal treatment system; wherein the system for remediation includes rehydration apparatus and the method further includ rehydrating discharged heated cuttings from the thermal treatment system with the rehydration apparatus to facilitate handling of the heated cuttings; feeding the discharged heated cuttings from the thermal treatment system to secondary treatment apparatus for milling and hydration therein; wherein the quench system includes a quench vessel and a water spray system for spraying water into the discharge stream to produce the cooled discharge stream, the method further including spraying cooling water with the spray system into the discharge stream to produce the cooled discharge stream; and/or wherein the quench vessel has a top and a bottom, the method further including introducing the discharge stream into the top of the quench vessel, and spraying cooling water into the discharge stream in the top of the quench vessel.

The present invention, therefore, provides, in at least some embodiments, methods for remediating drilled cuttings material including oil, solids, and water from a wellbore, the method including: introducing drilled cuttings material including oil, solids and water to a system for remediation, the system including a thermal treatment system and a condensing system; feeding a slurry of the drilled cuttings material to the thermal treatment system and heating the drilled cuttings material therein producing heated cuttings and a stream with oil and water and solids therein; discharging the heated cuttings from the thermal treatment system; feeding the stream with oil and water and solids therein to a quench system producing a cooled first stream and a cooled second stream, the cooled first stream containing vapor and the cooled second stream containing oil, water, and solids; feeding the cooled first stream to a condenser system producing a liquid stream and a gas stream; feeding the liquid stream to a weir tank system; feeding the cooled second stream to the weir tank system, and producing with the weir tank system a first weir stream of reusable oil and a second weir stream containing water and oil; recovering reusable water from the second weir stream. Such methods may include using a cooling apparatus to provides cooling fluid for cooling the condenser to enhance effectiveness of the condenser, the method further including cooling the condenser with cooling fluid from the cooling apparatus.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventor may rely on the Doctrine of Equivalents to determine and assess the scope of their invention and of the claims that follow as they may pertain to apparatus not materially departing from, but outside of, the literal scope of the invention as set forth in the following claims. Any patent or patent application referred to herein is incorporated fully herein for all purposes.

What is claimed is:

1. A method for treating material, the material including a first liquid component and solids, the method comprising introducing material including a first liquid component and solids to a system for remediation, the system including a thermal treatment system, a quench system, a weir tank system and a condensing system, feeding a liquid slurry of the material to the thermal treatment system and heating the liquid slurry therein producing heated discharge solids and a discharge stream with the first liquid component and solids therein, discharging the heated discharge solids from the thermal treatment system, feeding the discharge stream to a quench system, cooling the discharge stream in the quench system producing a cooled discharge stream, feeding the cooled discharge stream to the weir tank system, the weir tank system having a clean side and a dirty side, the cooled discharge stream fed to the dirty side of the weir tank system, the dirty side of the weir tank system comprising a first compartment with an under weir, an over weir, a first top weir and a second top weir, the under weir on a first side of the first compartment and the over weir on a second side of the first compartment spaced-apart from the first side, a second compartment adjacent the over weir, and a third compartment adjacent the under weir, the first top weir above the first compartment and the second top weir above the second compartment, flowing a first stream with oil and oil-laden solids over the over weir into the second compartment and from the second compartment flowing oil over the second top weir to the clean side of the weir tank system, flowing a second stream with oil and solids out from the second compartment for further processing, flowing oil under the under weir into the third compartment and then flowing oil over the first top weir into the clean side of the weir tank system, and flowing oil from the clean side for re-use.

2. The method of claim 1 further comprising flowing the second stream to centrifuge apparatus for further processing.

3. The method of claim 2 further comprising producing a first centrifuge stream with the centrifuge apparatus, the first centrifuge stream containing solids, and feeding the first centrifuge stream to the thermal treatment system for further processing therein.

4. The method of claim 1 wherein the system for remediation includes a condenser system and the method further comprising feeding an uncondensed quenched vapor stream from the quench system to the condenser system, said uncondensed quenched vapor stream containing solids, condensing at least part of said uncondensed quenched vapor stream producing a condensed stream, and feeding said condensed stream to the dirty side of the weir tank system.

5. The method of claim 4 wherein the system for remediation includes scrubber apparatus and the method further comprising prior to feeding the uncondensed quenched vapor stream to the condenser system, feeding the uncondensed quenched vapor stream to scrubber apparatus to remove solids, and then feeding the thus-scrubbed uncondensed quenched vapor to the condenser.

6. The method of claim 4 wherein a cooling apparatus provides cooling fluid for cooling the condenser to enhance effectiveness of the condenser, the method further comprising cooling the condenser with cooling fluid from the cooling apparatus.

7. The method of claim 4 further comprising producing uncondensed gases with the condenser, and oxidizing said uncondensed gases.

8. The method of claim 7 wherein the system for remediation includes a thermal oxidizer and the uncondensed gases are oxidized in the thermal oxidizer.

9. The method of claim 2 further comprising, prior to feeding the slurry to the thermal treatment system, feeding the liquid slurry to a secondary separator system, separating large pieces of material from the liquid slurry with the secondary separator system, and then feeding the liquid slurry with said large pieces removed to the thermal treatment system.

10. The method of claim 2 wherein the liquid slurry contains by volume a mixture of up to about 25% oil, up to about 25% water, and up to about 50% drilled cuttings.

11. The method of claim 10 wherein the system for remediation processes at least about 8 tons per hour of slurry.

12. The method of claim 2 wherein the system for remediation includes rehydration apparatus and the method further comprising rehydrating discharged heated cuttings from the thermal treatment system with the rehydration apparatus to facilitate handling of the heated cuttings.

13. The method of claim 1 wherein the thermal treatment system comprises a vessel with an interior wall dividing the vessel into two intercommunicating chambers, the vessel having two spaced-apart ends and a burner at each end for heating drilled cuttings material in each chamber.

14. The method of claim 13 wherein each burner is in a separate firebox adjacent each chamber.

15. The method of claim 13 wherein each burner is mounted within the vessel.

16. The method of claim 1 wherein the contaminants in the liquid slurry include hydrocarbon contaminants and the method further comprising volatilizing the hydrocarbons contaminants in the thermal treatment system.

17. The method of claim 1 further comprising feeding the discharged heated cuttings from the thermal treatment system to secondary treatment apparatus for milling and hydration therein.

18. The method of claim 1 wherein the quench system includes a quench vessel and a water spray system for spraying water into the discharge stream to produce the cooled discharge stream, the method further comprising spraying cooling water with the spray system into the discharge stream to produce the cooled discharge stream.

19. The method of claim 18 wherein the quench vessel has a top and a bottom, the method further comprising introducing the discharge stream into the top of the quench vessel, and spraying cooling water into the discharge stream in the top of the quench vessel.

20. A method for remediating drilled cuttings material including oil, solids, and water from a wellbore, the method comprising introducing drilled cuttings material including oil, solids and water to a system for remediation, the system including a thermal treatment system and a condensing system, feeding a slurry of the drilled cuttings material to the thermal treatment system and heating the drilled cuttings material therein producing heated cuttings and a stream with oil and water and solids therein, discharging the heated cuttings from the thermal treatment system, feeding the stream with oil and water and solids therein to a quench system producing a cooled first stream and a cooled second stream, the cooled first stream containing vapor and the cooled second stream containing oil, water, and solids, feeding the cooled first stream to a condenser system producing a liquid stream and a gas stream, feeding the cooled secondd stream to a weir tank system, the weir tank system having a clean side and a dirty side, the cooled second stream fed to the dirty side of the weir tank system, the dirty side of the weir tank system has a first compartment with an under weir and en over weir, the under weir on a first side of the compartment and the over weir on a second side of the first compartment spaced-apart from the first side, a second compartment adjacent the over weir, and a third compartment adjacent the under weir, flowing a first stream with oil and oil-laden solids over the over weir into the second compartment and from the second compartment flowing oil to the clean side of the weir tank system, flowing a second stream with oil and solids out from the second compartment for further processing, flowing oil under the under weir into the third compartment and then flowing oil from the third compartment into the clean side of the weir tank system, and flowing oil from the clean side for re-use.

\* \* \* \* \*